(12) United States Patent
Heynen et al.

(10) Patent No.: US 8,441,499 B2
(45) Date of Patent: May 14, 2013

(54) USER INTERFACE CONTRAST FILTER

(75) Inventors: Patrick Heynen, Redwood City, CA (US); Mike Stern, San Francisco, CA (US); Andrew Bryant, Los Gatos, CA (US); Marian Goldeen, Three Rivers, CA (US); Bill Feth, San Jose, CA (US)

(73) Assignee: Apple Inc., Cupertino, CA (US)

( * ) Notice: Subject to any disclaimer, the term of this patent is extended or adjusted under 35 U.S.C. 154(b) by 888 days.

(21) Appl. No.: 12/536,478

(22) Filed: Aug. 5, 2009

(65) Prior Publication Data

US 2011/0035552 A1 Feb. 10, 2011

(51) Int. Cl.
*G09G 5/02* (2006.01)

(52) U.S. Cl.
USPC ............. 345/589; 345/593; 345/594

(58) Field of Classification Search ........... 345/589–605
See application file for complete search history.

(56) References Cited

U.S. PATENT DOCUMENTS

| | | | | |
|---|---|---|---|---|
| 5,517,335 | A * | 5/1996 | Shu ............... | 358/518 |
| 6,081,254 | A | 6/2000 | Tanaka et al. | |
| 6,177,945 | B1 | 1/2001 | Pleyer | |
| 6,191,790 | B1 | 2/2001 | Bogdan | |
| 6,222,540 | B1 | 4/2001 | Sacerdoti | |
| 6,262,817 | B1 | 7/2001 | Sato et al. | |
| 6,348,936 | B1 | 2/2002 | Berteig | |
| 6,429,885 | B1 | 8/2002 | Saib et al. | |
| 6,842,541 | B2 * | 1/2005 | Curry ............. | 382/270 |
| 6,850,259 | B1 | 2/2005 | Rzepkowski et al. | |
| 7,079,711 | B2 | 7/2006 | Labelle | |
| 7,092,122 | B2 * | 8/2006 | Iwaki ............. | 358/1.9 |
| 7,095,434 | B1 * | 8/2006 | Ikeda ............. | 348/219.1 |
| 7,184,056 | B2 | 2/2007 | Brody et al. | |
| 7,227,990 | B2 * | 6/2007 | Hirao ............. | 382/167 |
| 7,236,154 | B1 | 6/2007 | Kerr et al. | |
| 7,242,409 | B2 * | 7/2007 | Cain ............. | 345/594 |
| 7,750,947 | B2 * | 7/2010 | Ahn ............. | 348/222.1 |
| 7,853,094 | B2 * | 12/2010 | Pan et al. ............. | 382/254 |
| 2001/0036310 | A1 | 11/2001 | Pettigrew et al. | |
| 2002/0152222 | A1 | 10/2002 | Holbrook | |
| 2003/0007011 | A1 | 1/2003 | Zimmerman et al. | |
| 2003/0021488 | A1 | 1/2003 | Shaw et al. | |
| 2003/0038832 | A1 | 2/2003 | Sobol | |
| 2003/0142138 | A1 * | 7/2003 | Brown et al. ............. | 345/797 |
| 2003/0142140 | A1 | 7/2003 | Brown et al. | |

(Continued)

FOREIGN PATENT DOCUMENTS

EP 0757309 2/1997

OTHER PUBLICATIONS

Updated portions of prosecution history of U.S. Appl. No. 11/625,806, Feb. 23, 2011, Broday, Sarah, et al.

(Continued)

*Primary Examiner* — Xiao M. Wu
*Assistant Examiner* — Charles Tseng
(74) *Attorney, Agent, or Firm* — Adeli & Tollen LLP

(57) ABSTRACT

A method of defining a dynamically adjustable user interface ("UI") of a device is described. The method defines multiple UI elements for the UI, where each UI element includes multiple pixels. The method defines a display adjustment tool for receiving a single display adjustment parameter and in response adjusting the appearance of the UI by differentiating display adjustments to a first set of saturated pixels from the display adjustments to a second set of non-saturated pixels.

27 Claims, 26 Drawing Sheets

U.S. PATENT DOCUMENTS

| | | | |
|---|---|---|---|
| 2003/0151611 | A1 | 8/2003 | Turpin et al. |
| 2004/0008208 | A1 | 1/2004 | Dresevic et al. |
| 2005/0212824 | A1 | 9/2005 | Marcinkiewicz et al. |
| 2006/0248276 | A1* | 11/2006 | Kilian et al. ............ 711/130 |
| 2006/0256067 | A1 | 11/2006 | Montero et al. |
| 2006/0284895 | A1 | 12/2006 | Marcu et al. |
| 2007/0096935 | A1 | 5/2007 | Lee et al. |
| 2007/0115285 | A1 | 5/2007 | Brody et al. |
| 2008/0165210 | A1* | 7/2008 | Platzer et al. ............ 345/672 |
| 2009/0217181 | A1* | 8/2009 | Kumar ............ 715/762 |
| 2010/0103186 | A1* | 4/2010 | Luengen et al. ............ 345/589 |

OTHER PUBLICATIONS

Updated portions of prosecution history of EP03790154, May 26, 2010, Apple Inc.

Updated portions of prosecution history of U.S. Appl. No. 11/625,806, Jun. 14, 2011, Brody, Sarah, et al.

Updated portions of prosecution history of U.S. Appl. No. 11/625,806, Mar. 16, 2011, Brody, Sarah, et al.

Portions of prosecution history of U.S. Appl. No. 10/301,500, Oct. 30, 2006, Brody, Sarah, et al.

Portions of prosecution history of U.S. Appl. No. 11/625,806, Nov. 23, 2009, Brody, Sarah, et al.

WO 2004/046906, Jun. 3, 2004, Apple Computer Inc.

EP1573501, Sep. 14, 2005, Apple Computer Inc.

International Search Report PCT/US2003/038026, May 25, 2005 (mailing date), Apple Computer Inc.

International Preliminary Examination Report of PCT/US2003/038026, Nov. 1, 2006 (Issuance date), Apple Computer Inc.

EP Office Action of EP03790154.3, Dec. 4, 2009, Apple Computer Inc.

EP Office Action of EP03790154.3, Jul. 12, 2006, Apple Computer Inc.

Screenshots #1-13 of Microsoft Windows NT 4.0. Microsoft Corporation, Copyright 1981-1998. Released, Aug. 1996. Screenshots created Oct. 13, 2004.

Updated portions of prosecution history of U.S. Appl. No. 11/625,806, May 18, 2010, Brody, Sarah, et al.

Updated portions of prosecution history of U.S. Appl. No. 10/301,500, Oct. 23, 2007, Brody, Sarah, et al.

* cited by examiner

USER INTERFACE CONTRAST FILTER

FIELD OF THE INVENTION

The present invention relates to a display control item for adjusting display settings of a user interface.

BACKGROUND OF THE INVENTION

Many applications generate user interfaces that include various user interface items (e.g., buttons, menu items, selection controls, etc.), background colors and/or images, and content display areas (e.g., an image editing pane, a video playback pane, etc.). These various user interface component may include black and white sections, grayscale sections, and colored sections that span a range of color saturation values.

In many cases, an application user may wish to adjust the display of the user interface generated by the application. For instance, a user may wish to adjust the brightness or contrast of the display based on ambient lighting conditions, personal preferences, etc. In some cases, while a user wishes to change the display settings of particular user interface items such that certain features or aspects of the user interface items may provide better visibility to the user, the user does not wish to affect the display of any content display areas. Current applications do not allow a user to easily adjust the display of user interface items without affecting the display of any content that may be included in a content display area of the user interface.

In addition, a user may wish to adjust the display of various user interface items such that dark or dully-colored user interface items are affected more than brightly-colored or black and white user interface items. Typically, applications that allow display adjustments affect all areas of the user interface equally.

Thus, there is a need for a display adjustment system that allows a user to change user interface display settings without affecting the display settings of any content display areas included in the user interface. In addition, there is a need for a display adjustment control that treats brightly-colored user interface items differently than dully-colored or grayscale user interface items. Furthermore, the display adjustment system must efficiently generate, and/or retrieve from storage, the various user interface items when changes in the display settings occur.

SUMMARY OF THE INVENTION

Some embodiments provide a method of defining a dynamically adjustable user interface ("UI") of a device. The method defines multiple UI elements for the UI, with some UI elements defined by reference to saturated colors, other UI elements defined by reference to non-saturated colors, and still other UI elements defined by reference to both saturated and non-saturated colors. The method defines a display adjustment tool for receiving a single display adjustment parameter, and in response, adjusting the appearance of the UI by differentiating display adjustments to saturated colors of the UI elements from the display adjustments to non-saturated colors of the UI elements. Specifically, the display adjustment control in some such embodiments changes the appearance of non-saturated colors more than it changes the appearance of saturated colors for a particular change in the display adjustment parameter.

In some embodiments of the invention, the display adjustment tool includes (1) a user-modifiable display adjustment control for defining the display adjustment parameter, and (2) a display adjustment module for adjusting the appearance of the UI by differentiating display adjustments to saturated colors of the UI elements from the display adjustments to non-saturated colors of the UI elements. Instead of, or in conjunction with, the user-modifiable display adjustment control, the display adjustment tool of some embodiments includes a light-sensor module that produces a display adjustment parameter in response to changes to light conditions in the environment in which the device operates. In some embodiments, the device has a light sensor that produces a signal that specifies changes in light conditions, and provides this signal to the light-sensor module, which in turn produces the display adjustment parameter. From this parameter, the display adjustment module can then adjust the appearance of the UI elements for the new light condition.

The method of some embodiments does not adjust the color of areas of the UI that contain content (e.g., thumbnail images, digital video, a digital image, etc.). In other words, some embodiments perform the color adjustment operations for only the non-content elements (e.g., the user selectable UI elements, the UI background design, the UI descriptive text, etc.) and not for the content elements of the UI. Also, some embodiments allow certain non-content UI elements to be explicitly or implicitly masked from the color adjustment operations.

Some embodiments cache UI elements to improve application performance when adjusting the appearance of the UI. In some embodiments, the cache stores UI elements that were previously processed for a particular value of the display adjustment parameter. Such cached UI elements may be reused by accessing the cached copies rather than re-processing the UI elements stored on disk. Some embodiments share the cached UI elements across multiple applications having multiple UIs.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a single display adjustment control that optimizes the appearance of a UI for different lighting conditions. In some embodiments, the display adjustment control differentiates the treatment of saturated pixels in the UI from non-saturated pixels in the UI. Specifically, the display adjustment control in some such embodiments changes the appearance of non-saturated pixels more than it changes the appearance of saturated pixels for a particular change in lighting conditions.

Figure 1:
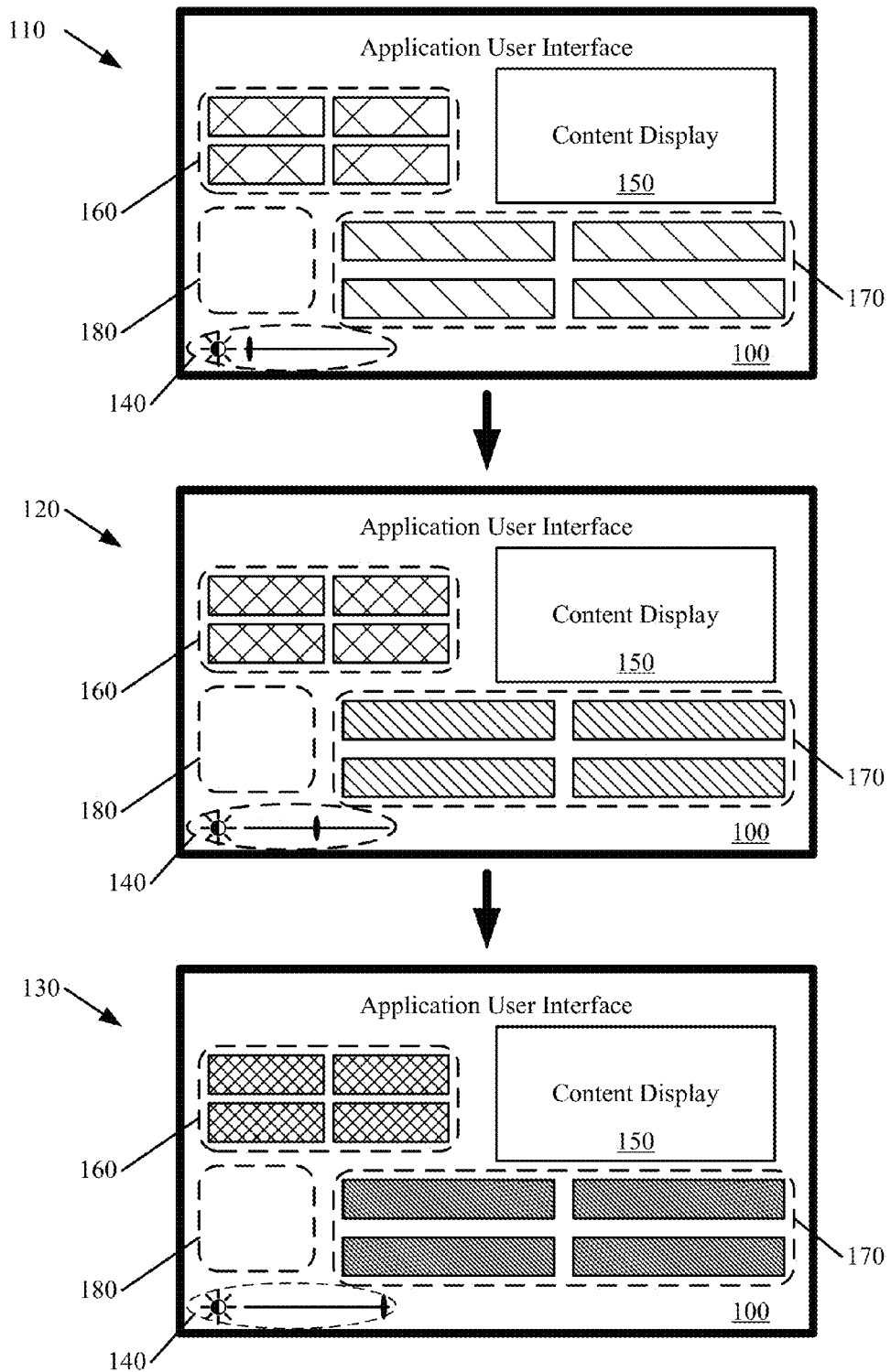
FIG. 1 illustrates a user interface ("UI") of an application with a display adjustment control.

For some embodiments of the invention, FIG. 1 illustrates an application UI 100 with one such display adjustment control. Specifically, this figure illustrates the UI 100 at three different stages 110-130, a first stage 110 where the display adjustment control 140 (a contrast control in this example) is positioned such that the contrast is at a minimum level, a second stage 120 that is after the adjustment control 140 has been moved to a mid-point, and a third stage 130 that is after the adjustment control 140 has been moved to a maximum level.

As shown in this figure, in addition to the display adjustment control 140, the UI 100 includes a content display area 150, various UI elements 160 that have high color saturation values, various UI elements 170 that have low color saturation values, and a UI background area 180. The UI elements are for receiving input from a user and/or providing information to the user. These UI elements may include various buttons, menu selection items, indicators, etc. The UI elements, as displayed to a user, may include black and white, grayscale, and/or color pixels. Such UI elements may be arranged in different configurations in different applications. The content display area 150 is for displaying various representations of content (e.g., thumbnail images, digital video, a digital image, etc.). Different UIs may have various different backgrounds that include some combination of pixels of various different colors, one or more images, etc.

The UI elements 160 and 170 may be used to receive input from a user and/or to provide information to the user. These UI elements may include various buttons, menu selection items, indicators, etc. These UI elements may include black and white, grayscale, and/or color pixels. Although the example of FIG. 1 represents high color saturation elements 160 and low color saturation elements 170 as being placed in particular locations of the UI 100, one of ordinary skill will recognize that the UI elements may be arranged in different configurations in different applications. The background area 180 is shown in this example as white, indicating a uniform background color. Different UIs may include various different backgrounds that may include pixels of various different colors, one or more images, etc.

The operation of the UI display adjustment will now be described by reference to the state of this UI during the first, second, and third stages 110-130 that are illustrated in FIG. 1. In the first stage 110, the display control 140 is positioned at its minimum value. As shown, the content display area 150 is represented as completely white, while the high color saturation UI elements 160 and the low color saturation UI elements 170 are represented with a first fill pattern and a second fill pattern, respectively. In addition, the UI background 180 is shown as completely white, indicating that the background has a different color (and color saturation) than that of elements 160 or 170.

In the second stage 120, the display control 140 has been moved to a mid-point value. The change in the display control does not affect the display of the content display area 150, which is still shown as a completely white area of the UI 100. However, one of ordinary skill in the art will recognize that some embodiments may also update each content display area based on the selected display control value. In some embodiments, each content display area may be updated (or not updated) based on a user selected option, a default condition, or some other appropriate criteria. The change in the display control 140 setting has affected the fill pattern shown for the high color saturation elements 160 and the low color saturation elements 170. In some embodiments, the UI background area 180 may also be changed to increase contrast between the background and the various UI items 160-170.

As shown in the second stage 120, the display of the high color saturation elements 160 and the low color saturation elements 170 have been updated such that the fill patterns are more dense in the second stage 120 than the first stage 110. In order to optimize the contrast increase, in this example the high color saturation fill pattern has had its density increased by a factor of two while the low color saturation fill pattern has been increased by a factor of three. Thus, in this example, the elements with lower color saturation values 170 are affected more than the elements with high color saturation values 160.

In the third stage 130, the display control 140 has been moved to a maximum value. As above, the change in the display control does not affect the display of the content display area 150, which is still shown as a completely white area. The change in the display control 140 setting has again affected the fill pattern shown for the high color saturation elements 160 and the low color saturation elements 170.

As shown, the fill pattern of the UI background area 180 has not been changed from the second stage 120 in response to the movement of the display control 140. In contrast, the display of the high color saturation elements 160 and the low color saturation elements 170 have been updated such that the fill patterns are more dense in the third stage 130 than the second stage 120. As above, the high color saturation fill pattern has had its density increased by a factor of two in this example while the low color saturation fill pattern has been increased by a factor of three. Thus, the elements with lower color saturation values 170 are affected more than the elements with high color saturation values 160.

Although the example of FIG. 1 and many of the examples that follow below show various specific UIs, controls, display areas, etc., one of ordinary skill in the art will recognize that other embodiments may implement these elements in different ways. For instance, instead of a display adjustment control 140, some embodiments may utilize pull-down or pop-up menu selections to control the display adjustment. In addition, different UIs may include different variations of high color saturation areas, low color saturation areas, content display areas, etc.

Figure 2:
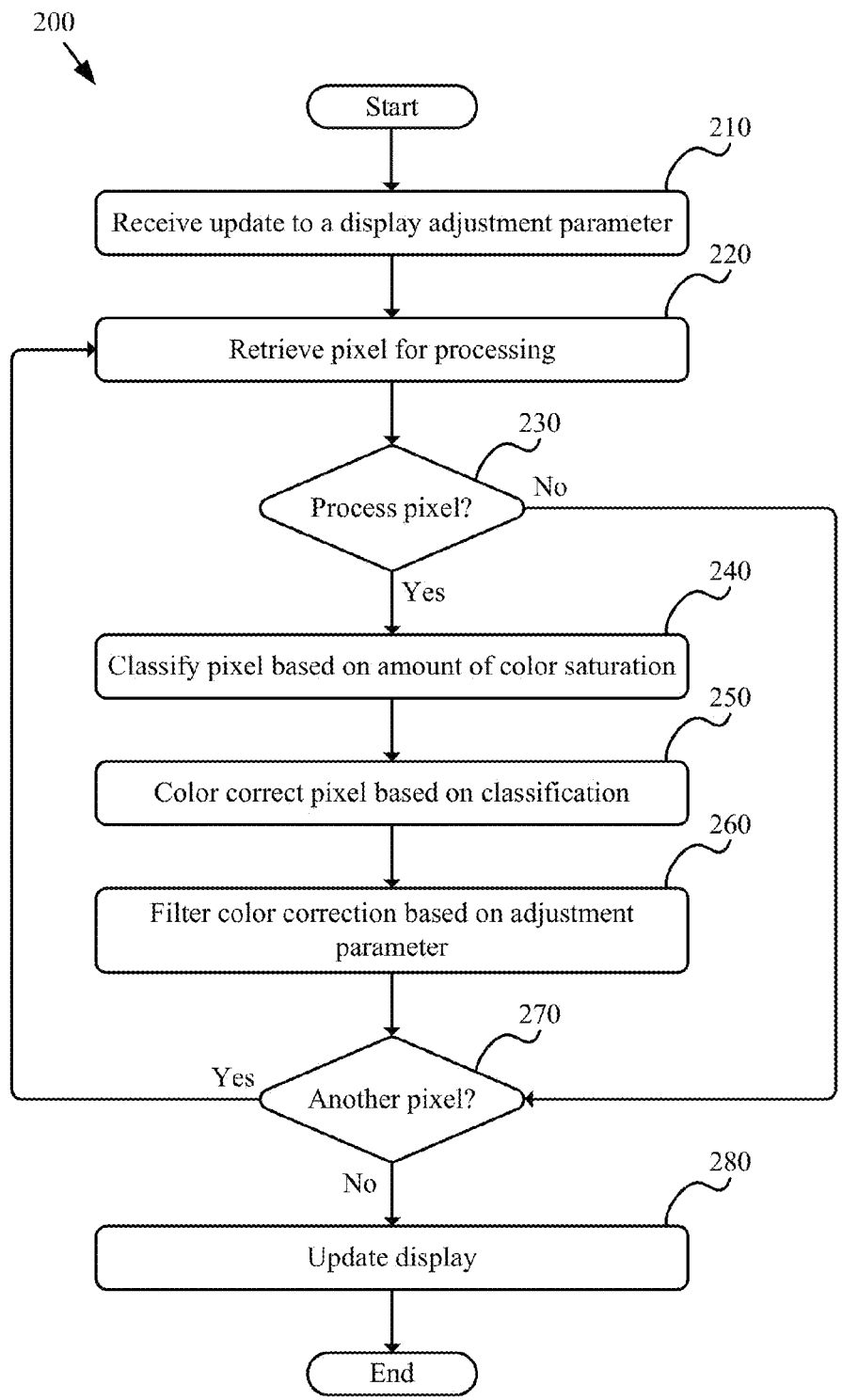
FIG. 2 illustrates an example of a conceptual process that some embodiments perform when a request is made to adjust a UI display parameter.

FIG. 2 illustrates an example of a conceptual process 200 that some embodiments perform when a request is made to adjust a UI display parameter. Process 200 will be described with reference to FIG. 1. Process 200 is a conceptual representation of the operations used when an update to a display adjustment parameter is received, causing a "re-draw" command to be issued. The specific operations of the process may not be performed in the exact order described or different specific operations may be performed in different embodiments. Also, the process may not be performed as one continuous series of operations. Furthermore, the process could be implemented using several sub-processes, or as part of a larger macro-process.

The process begins when it receives (at 210) an update to a display adjustment parameter (e.g., brightness, contrast, etc.). The update to the display parameter may be received in various ways. For example, the display parameter may be received by quantifying the slider position of a UI control element such as display adjustment control 140. Alternatively and/or conjunctively, the display parameter may be updated based on a pull-down or pop-up menu selection, a combination of keystrokes, a "hot-key" (e.g., selecting "ctrl-alt-brightness+" or "ctrl-alt-brightness−", where "brightness+" and "brightness−" are hotkeys provided by a keyboard or keypad), a change in ambient light as measured through a light sensor, etc. In addition, some embodiments include options that allow a user to select "go-to-max" or "go-to-min" such that a user may directly select a maximum or minimum value of the display adjustment parameter. In some embodiments, the process may monitor a display adjustment parameter and determine whether a change in the parameter's value has exceeded a particular threshold before continuing. In addition, some embodiments may perform process 200 at regular intervals, regardless of whether a display adjustment parameter has changed.

One of ordinary skill in the art will recognize that process 200 may be initiated in a variety of other ways. For instance, in some embodiments, a first application may receive an update to a display adjustment parameter, and issue a re-draw command to a UI drawing framework, which may cause a framework command (i.e., a function) to be called to adjust the display of UI elements of the first application. Such a UI framework may include various artwork and APIs that are used by one or more applications to render various UI items for display.

In some embodiments, the call to the framework command may further trigger redrawing of UI elements of any other applications that share the same framework with the first application such that the UI elements of the other application are dynamically updated based on the change in the display adjustment parameter of the first application.

For instance, an update to a display parameter of a first application may trigger an update to a second application which shares the same framework such that a redraw command is called for the second application to redraw its UI elements. This redrawing of the UI elements may entail recursively rendering several other UI elements of the second application's UI.

After receiving (at 210) an update to the display adjustment parameter, the process retrieves (at 220) a pixel for processing. In some embodiments, the pixel is from a previously-rendered version of a UI, such as UI 100 as shown in the first stage 110. One of ordinary skill in the art will recognize that although many of the operations of process 200 are described with reference to a single pixel, some embodiments may process multiple pixels at one time (e.g., UI items such as buttons, artwork, menu items, etc.). In addition, although the process may receive only a single pixel (e.g., when a color is specified), any number of pixels may be generated at the output (e.g., when creating a background area of a UI that includes a single color).

After retrieving (at 220) a pixel from the input image, the process determines (at 230) whether the pixel will be processed based on the display adjustment parameter. As described above, some embodiments modify the display of particular UI items (e.g., non-content items) based on the display adjustment parameter, while the display of other items (e.g., content items) is not updated based on the display adjustment parameter. In some of these embodiments, the UI application determines which UI items will receive processing based on the display adjustment parameter, while in other embodiments the UI framework may determine the processing to be performed on various UI items.

Some embodiments may use a mask (e.g., a content mask) to define the sections of the UI that will not be modified based on the display adjustment parameter (e.g., sections that include content). In some embodiments, the mask is simply a black and white image where the white areas include sections of the UI that will be modified based on the display adjustment parameter and the black areas include sections of the UI that will not be modified based on the display adjustment parameter. Other embodiments may mask the content display areas using various other appropriate methods. In addition, some embodiments may pass a flag or some other indication to the framework indicating the processing that will be performed on a particular UI item. Applying different processing to different items or areas of the UI will be described in more detail in sub-section I.A below. The content display area 150 is one example of such a UI section that is not affected by changes to the display adjustment parameter.

When the process determines (at 230) that the pixel will be processed according to the modified display adjustment parameter, the process classifies (at 240) the pixel based on the amount of color saturation. Otherwise, the process proceeds to operation 270 which will be described below. High color saturation elements 160 and low color saturation elements 170 are examples of such classification of pixels based on color saturation levels. After classifying (at 240) the pixel based on the amount of color saturation, the process color corrects (at 250) the pixel based on the classification. The calculation of color saturation values, classification of pixels, and the color correction operation will be described in more detail in sub-section I.B below.

After color correcting (at 250) the pixel, the process filters (at 260) the color correction based on the display adjustment parameter. In some embodiments, this filtering is achieved by blending, based on the display adjustment parameter, the color corrected pixel with the pixel retrieved (at 220) from the input image. Thus, in the example shown in FIG. 1, when the display adjustment control 140 is placed at the far left end of the slider, the output pixel is the same as the input pixel (i.e., the blend operation selects the input pixel and ignores the color corrected pixel). In contrast, when the display adjustment control 140 is placed at the far right end of the slider, the blend operation selects the color corrected pixel and ignores the input pixel. When the display adjustment control 140 is placed at an intermediate location along the slider, the output pixel is a weighted combination (based on the slider position) of the input pixel and the color corrected pixel.

After filtering (at 260) the color correction or when the process determines (at 230) that the pixel will not be processed according to the modified display adjustment parameter, the process determines (at 270) whether there is another pixel in the input image. When the process determines that there is another pixel in the input image, the process performs operations 220-270 as described above.

When the process determines (at 270) that there are no more pixels in the input image to process, the process updates (at 280) the display of the UI using the filtered color corrected pixels generated by process 200. Although not shown, process 200 may iteratively perform operations 220-270 for different layers of the UI output (e.g., background, buttons, shadows, text, etc.) before compositing the different layers and updating the display. Stages two 120 and three 130 of FIG. 1 illustrate two such display updates to the UI 100. After updating (at 280) the UI display, the process ends.

One of ordinary skill in the art will recognize that although references were made to content display areas of a UI versus non-content display areas, various other criteria could be used to determine which sections of the UI receive processing as specified in operations 240-260 above. For instance, some UI elements may be intended to represent absolute color values and/or UI elements where the color has a particular meaning (e.g., color scope, color picker, etc.), and therefore would not be adjusted by a contrast adjustment algorithm. As another example, a UI designer may prefer that certain UI items (e.g., a particular button or menu item) are not affected by changes in, for example, a contrast setting, while other UI items (e.g., other buttons or menu items) would be affected by a change in a contrast setting.

Several more detailed embodiments of the invention are described in the sections below. Section I provides a detailed description of the display adjustment operations. Next, Section II shows several example UIs as displayed based on various adjustments. Section III follows that discussion with a description of the caching of UI items to optimize performance. Section IV describes the software modules used by some embodiments to implement the display adjustment. In addition, Section IV described automatic display adjustments based on ambient lighting conditions. Section V then describes the use of an application development tool that allows application developers to define various display adjustment parameters and algorithms. Next, Section VI describes the process used to define the UI display control of some embodiments. Lastly, Section VII describes a computer system which implements some of the embodiments of the invention.

I. Display Adjustment

As mentioned above, some embodiments allow display adjustments that affect different UI elements differently. Subsection I.A will describe a detailed example of performing different image-processing operations on different UI sections by reference to FIGS. 3-4. Sub-section I.B will then describe a conceptual process used by some embodiments to adjust the UI display by reference to FIGS. 5-7. Next, sub-section I.C describes, by reference to FIGS. 5 and 8-9, an operational tree diagram used by some embodiments to process the UI display elements.

A. Alternative Processing of User Interface Items

Figure 3:
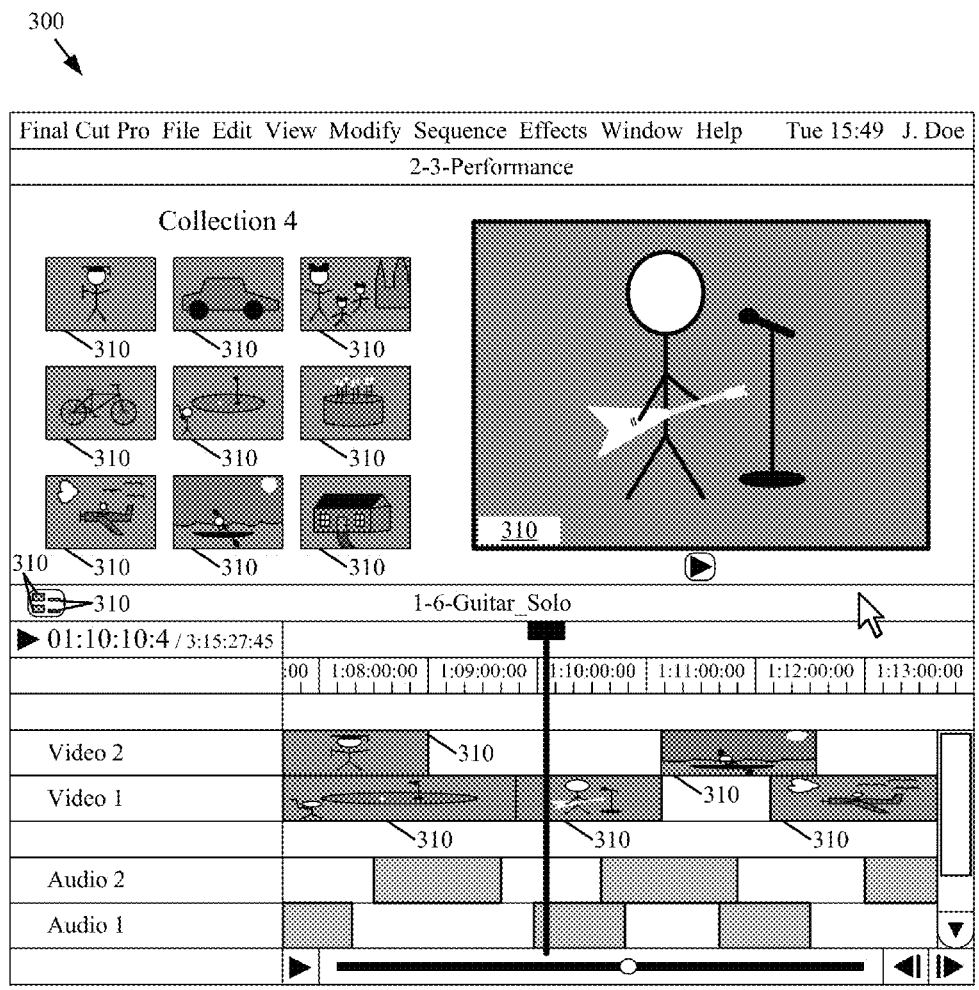
FIGS. 3-4 illustrate one example of using a content mask such that only non-content areas of a UI are affected by a change in a display parameter.
Figure 4:
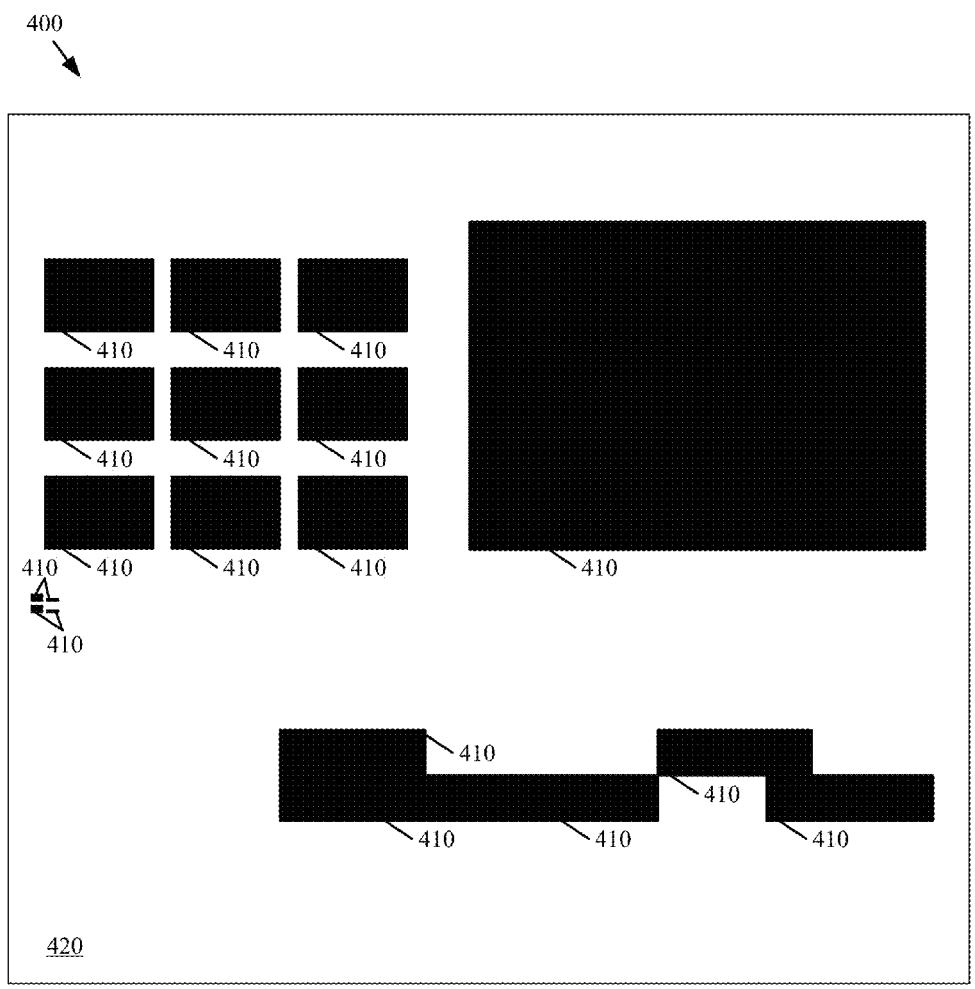

FIGS. 3-4 illustrate one example way of defining various UI items such that only certain UI items are affected by a change in a display parameter. Like the UI 100 of FIG. 1, the UI 300 of FIG. 3 includes various UI items 310 that will not be adjusted in response to a change in a display adjustment parameter. As described above, in some embodiments, UI items such as, for example, content display areas, are not affected by changes to a particular display adjustment parameter. One way to implement this feature is through the use of an explicit and/or implicit mask, such that various UI areas are defined as content display areas (or non-content display areas) by the developer of the UI application.

FIG. 4 illustrates an example of such a mask 400. The mask corresponds to the UI 300 shown in FIG. 3. In some embodiments, a mask is an image where the pixel values are used to determine when operations will be performed on the UI to be processed. Conceptually, the mask is used as a gate to determine which pixels will be changed and which will be unaffected by a change in a display adjustment parameter. Thus, in some embodiments, the mask may be an array of values (e.g., an array of 1s and 0s), where each value corresponds to a particular pixel in the UI.

In the example of FIG. 4, the mask 400 includes various sections 410 that correspond to content display areas 310 of the UI 300. These sections 410 of the mask 400 are indicated by black pixels (and may alternatively be represented by an array element with a value of 0). In addition the content mask indicates non-content areas of the UI 300 using white pixels 420 (and may alternatively be represented by an array element with a value of 1). Although the example of FIG. 4 shows only two different processing options (i.e., black or white), some embodiments may use any number of different processing options. The different processing options allow different processing to be specified for each UI item, as appropriate. For instance, some UI items may not receive any color correction or contrast processing (e.g., any section of the UI where absolute color is important). Such alternative processing options will be described in more detail in sub-section I.C below.

In some embodiments, the application generating the UI 300 may generate a mask based on different previously-defined areas of the UI (e.g., content display areas, UI items such as buttons, UI items such as background colors or patterns, etc.) that are designated to receive different image processing operations. In other embodiments, the mask 400 may be manually generated, stored, and made available to the application that generates the UI.

In addition to the mask (or array) described above in reference to FIGS. 3-4, other embodiments may define the processing to be performed on various UI items using different types of masks or data structures or using other appropriate ways. In addition, different embodiments may designate the processing to be performed using different operations than those described above. For instance, some embodiments may perform display adjustment on all the pixels included in the UI and then superimpose the content display areas over the adjusted UI.

B. Display Adjustment Algorithm

Figure 5:
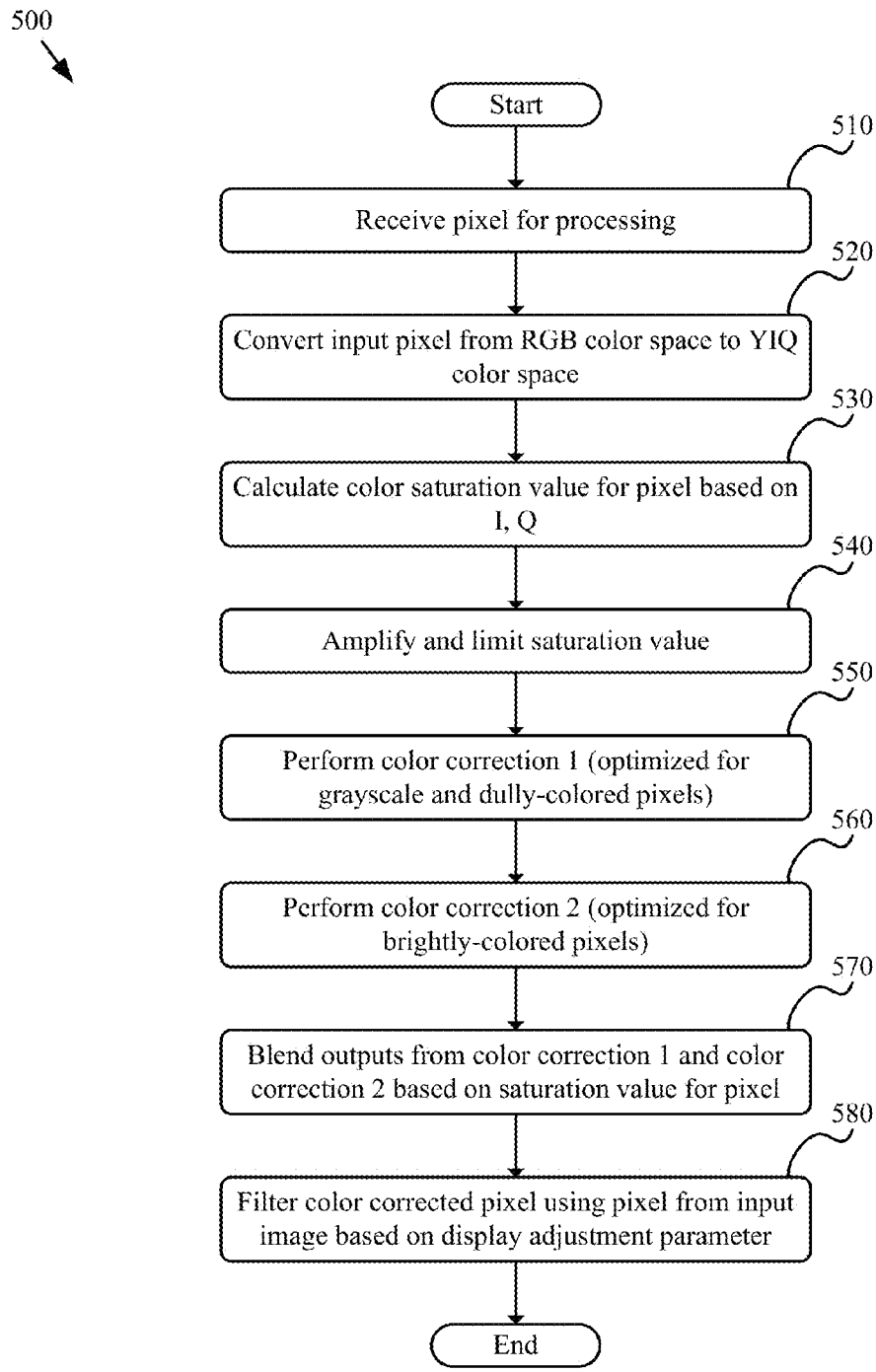
FIG. 5 illustrates an example of a conceptual process that some embodiments perform when a display adjustment parameter is changed.

FIG. 5 illustrates an example of a conceptual process 500 that some embodiments perform when a display adjustment parameter is changed. Process 500 provides a more detailed description of the operations 240-260 described above in reference to process 200. Process 500 will be described with reference to process 200 and FIGS. 6-7.

Process 500 begins when it receives (at 510) a pixel for processing. As described above, different pixels may receive different processing. In this example, any received pixels have been designated to receive processing by process 500. In some embodiments, the pixel may be any pixel from a UI item that is designated, by a mask such as that described above in reference to FIGS. 3-4, to receive processing based on an updated display adjustment parameter. In other embodiments, other types of masks or other methods of designating UI items for processing may be used. In addition, some embodiments may not use any mask at all and simply process all pixels from an input image using process 500.

Figure 6:
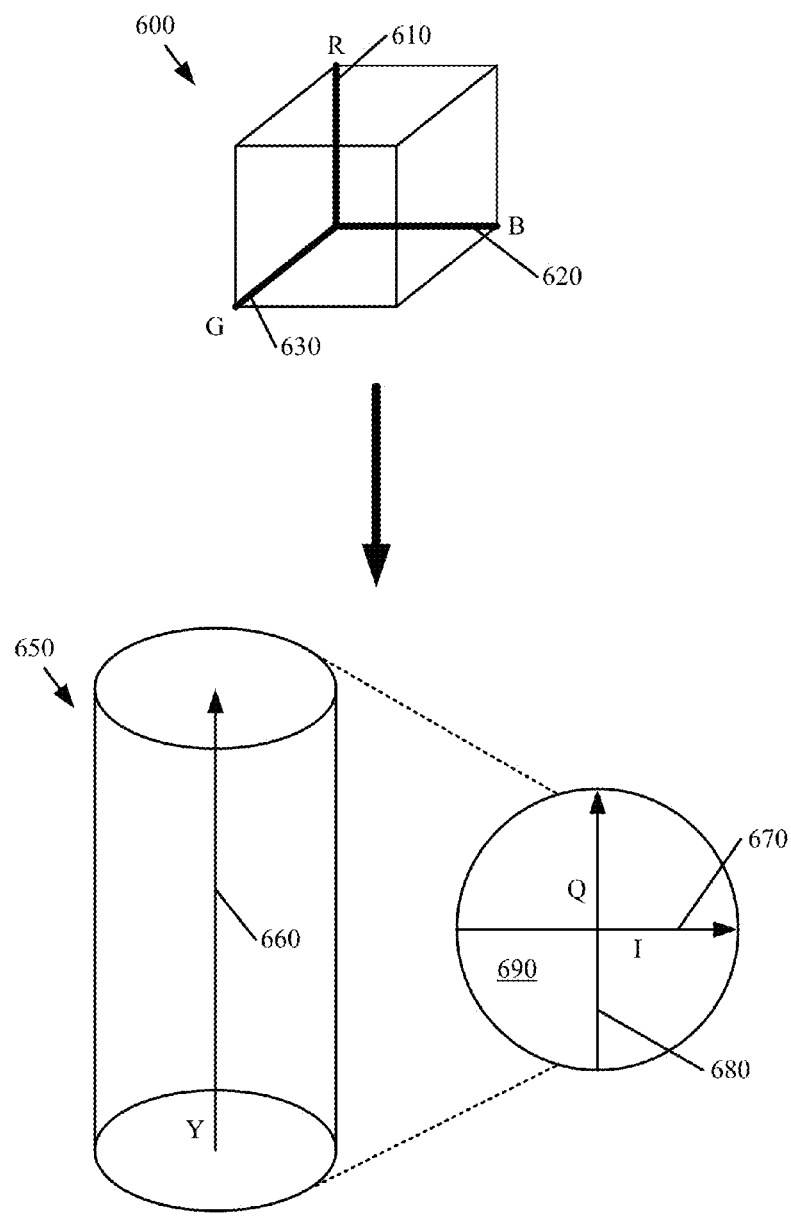
FIG. 6 illustrates the RGB and YIQ color spaces.

After receiving (at 510) a pixel for processing, the process converts (at 520) the pixel from RGB color space to YIQ color space. FIG. 6 illustrates the RGB 600 and YIQ 650 color spaces. Specifically, this figure shows conceptual representations of the color definition properties of each color space. As shown, the RGB color space 600 includes three orthogonal axes, a red color axis 610, a blue color axis 620, and a green color axis 630. The RGB color space is an additive color space. As such, each color in the space 600 may be defined by specifying a red value, blue value, and green value along the axes 610-630 and then adding the three primary component colors to achieve the desired output color.

In addition to the RGB color space 600, FIG. 6 shows the YIQ color space 650, which includes a Y (or luminance) axis 660, an I (or in-phase, orange-blue) axis 670, and a Q (or quadrature, purple-green) axis 680. Breakout section 690 shows a two-dimensional representation of the YIQ color space 650 that ignores the Y component. Although section 690 may typically be represented as a square, as the values along the I and Q axes may range between −1 and 1, in this example the section 690 is shown as a circle for clarity.

In order to perform (at 520) the color space conversion, a matrix multiplication is used by some embodiments. This matrix multiplication may be performed in some embodiments using the following equation:

$$\begin{bmatrix} Y \\ I \\ Q \end{bmatrix} = \begin{bmatrix} 0.299 & 0.587 & 0.115 \\ 0.596 & -0.275 & -0.321 \\ 0.211 & -0.523 & 0.311 \end{bmatrix} \cdot \begin{bmatrix} R \\ G \\ B \end{bmatrix} \quad (1)$$

where R, G, and B represent the values used to define the pixel in the RGB color space and Y, I, and Q represent the corresponding values used to define the pixel in the YIQ color space. The coefficients used to generate the YIQ values are for illustrative purposes only and different values may be used in different situations. Thus, the coefficients may vary depending on the preferences of the UI designer, available display devices, display drivers, operating system, etc.

Next, the process calculates (at 530) a color saturation value for the pixel based on the I and Q values calculated at 520. The color saturation value is calculated as the distance from the origin of the I and Q axes 670-680 to the point defined by the I and Q values calculated for the pixel using an equation such as equation 1. The color saturation value is calculated in some embodiments using the following equation:

$$\text{Saturation} = \sqrt{(I^2 + Q^2)} \quad (2)$$

where I and Q are the values calculated using equation (1) above.

Since the values of I and Q are limited in range from −1 to 1, the calculated saturation value may range from 0 to 1. Since the Y, or luminance, value is ignored in the saturation calculation, brightness of the pixel does not affect the saturation value, only the intensity of the color of the pixel will affect the saturation value. Thus, brightly colored pixels will have a higher saturation value, while dully colored pixels (and grayscale pixels) will have a lower saturation value, and black and white pixels will have a saturation value of zero. These individual saturation values may collectively be referred to as a "saturation mask" that indicates saturation levels for each pixel in the input image.

Figure 7:
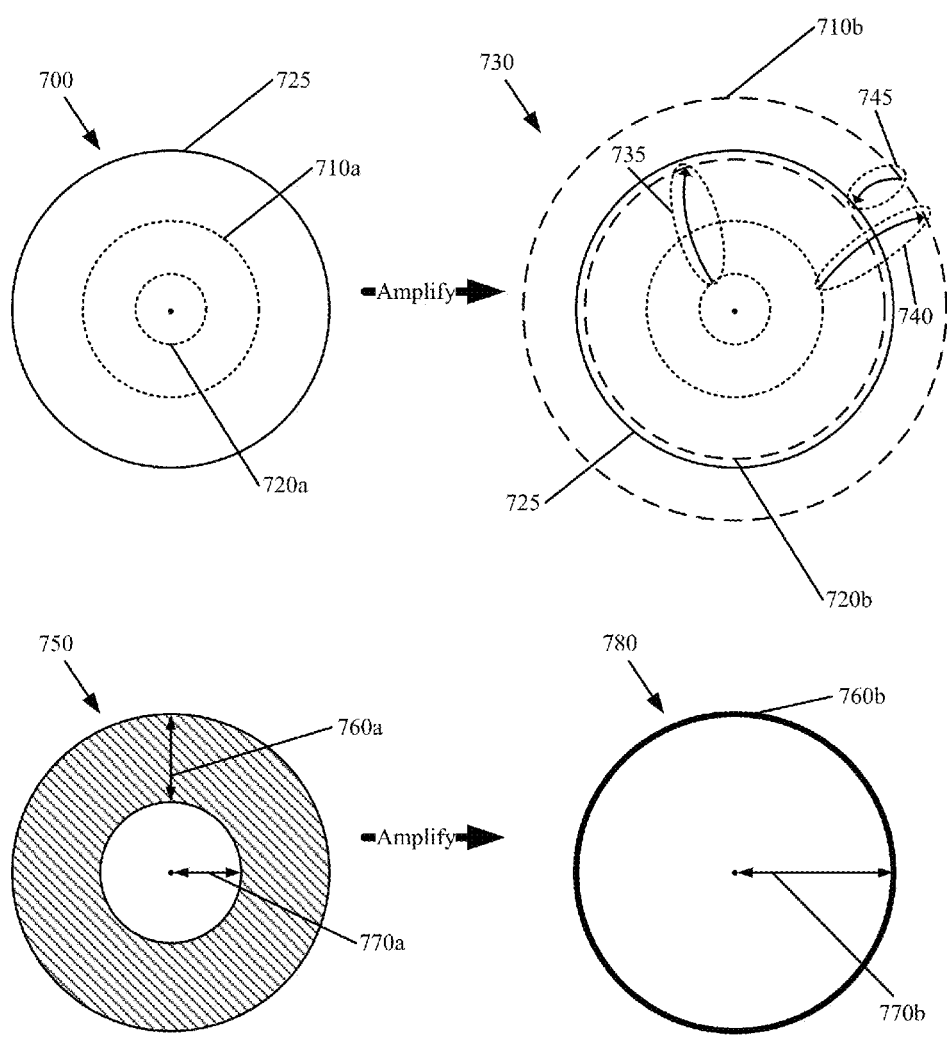
FIG. 7 provides a conceptual representation of the amplification and limiting of a saturation value.

After calculating (at 530) the color saturation value, the process amplifies and limits (at 540) the calculated saturation value. This amplification is used to increase the difference in saturation values between dully colored pixels, while limiting the difference in saturation values between brightly colored pixels. FIG. 7 provides a conceptual representation of the amplification and limiting of the saturation value. Specifically, the figure shows various circular two-dimensional (i.e., ignoring the Y value) representations of the YIQ space 700, 730, 750, and 780, where two of the representations 700 and 750 are before amplification and limiting of the saturation value and two representations 730 and 780 that are after the amplification and limiting.

As shown in FIG. 7, the first IQ space 700 includes two indicators 710a and 720a that show two saturation levels before amplification. Indicator 710a represents pixels having a higher saturation value than indicator 720a (i.e., higher saturation values are further away from the center of the space 700). The outer edge 725 of the space 700 indicates fully saturated pixels (i.e., pixels with a saturation value of 1). IQ space 730 represents the results of applying amplification and limiting to the space 700. As shown, the saturation level shown by indicator 720a has been moved away from the center of the circle, indicated by arrow 735, to an amplified saturation level shown by indicator 720b. This movement away from the center of the color space indicates an increase in saturation level. Likewise, the saturation level shown by indicator 710a has been moved to a location further away from the center of the circle, indicated by arrow 740, to an amplified saturation level shown by indicator 710b.

Because the amplification is limited (e.g., to maintain a maximum saturation value of 1), any values greater than the maximum saturation value (i.e., points outside the outer edge 725 of the IQ space 730) are set to the maximum saturation value. This limiting is indicated by arrow 745. This amplification and limiting may be performed in some embodiments by generating a mask value using the following equation:

$$\text{Mask} = \text{Maximum}[\text{Gain} \cdot \sqrt{(I^2 + Q^2)}, 1] \quad (3)$$

where I and Q are the values calculated using equation (1) above, Gain is a parameter that may be set, for example, by an application developer based on the desired performance of the display adjustment, and the Maximum function returns the larger of its two arguments (i.e., in this example, the maximum value of Mask is 1).

IQ space 750 illustrates another example representation of the saturation amplification and limiting operations. As shown, the space 750 has a range 760a of values that will be set to the maximum saturation value after amplification and limiting. This range 760a includes saturation values from 1/Gain to 1. In other words, any saturation values greater than 1/Gain will be set to the maximum allowed value of 1. This is indicated in the post-amplification IQ space 780, which shows the result of the amplification and limiting operation. As shown, the region of saturation values 760a from IQ space 750 is now limited to the border 760b of the IQ space 780. Although the border is drawn as a thicker line in this example to indicate that a range of saturation values have been set to the maximum saturation value, one of ordinary skill in the art will recognize that the indicator 760b includes only those post-amplification and limiting saturation values equal to 1.

In addition to the range of values 760a that are moved to full saturation after the amplification, IQ space 780 shows that the range of saturation values 770a is increased such that the range of amplified saturation values 770b fills the entire IQ space 780 (excluding the outer border 760b). In this manner, differences in saturation values for less-saturated pixels are increased, while the differences in saturation values for more-saturated pixels are reduced or eliminated.

The amplification parameter ("Gain" in equation (3)) of some embodiments may be set by a UI developer to achieve the desired level of control when adjusting the UI display. In other words, the developer may use the gain parameter to set the range of saturation values calculated based on I and Q that will be designated as fully saturated after amplification and limiting, versus the range of values that will be less than fully saturated after amplification and limiting. The selection of various parameters used by some embodiments to control the UI display adjustment will be described below in Section V. In other embodiments, an end-user may be able to adjust the gain parameter either directly (e.g., by setting slider position) or indirectly (e.g., by selecting a particular display option from a menu).

Returning to process 500, after performing (at 540) amplification and limiting of the saturation value, the process performs (at 550) a first color correction operation. The first color correction operation is optimized for grayscale and dully-colored pixels (i.e., pixels with a lower calculated, amplified, and limited saturation value). The first color correction operation is performed in some embodiments using the following equation:

$$\text{GrayOut} = (\text{Input}^{GrayGamma} + \text{GrayLift}) \cdot \text{GrayGain} \quad (4)$$

where Input refers to the original RGB values for the input pixel, and GrayGamma, GrayLift, and GrayGain are parameters that may be set based on the desired performance of the color correction operation. Although not shown explicitly, the GrayOut variable includes values corresponding to each of the R, G, and B input values used to define the input pixel.

Thus, as shown by equation (4), the first color correction operation includes a gamma correction operation (i.e., an allometric function), a lift adjustment (i.e., an addition operation), and a gain adjustment (i.e., a multiplication operation). The parameters ("GrayGamma", "GrayLift", and "GrayGain") that define the properties of this first color correction operation may be set by an application developer in some embodiments such that the display adjustment of the UI is optimized. In other embodiments, similarly to the amplification parameter described above, an end-user may be able to adjust the parameters either directly or indirectly.

After performing (at 550) the first color correction operation, the process performs (at 560) a second color correction operation. The second color correction operation is performed based on the received input pixel, and not on the output of the first color correction operation. The second color correction operation is optimized for brightly-colored pixels (i.e., pixels with a higher calculated, amplified, and limited saturation value). The second color correction operation is performed in two stages. The first stage of the second color correction involves a saturation control operation that may be performed in some embodiments using the following equation:

$$\text{Color SAT} = \text{luminance}(1 - \text{ColorSaturation}) + \text{Input} \cdot \text{ColorSaturation} \quad (5)$$

where luminance is the luminance value of the input pixel (e.g., the "Y" value, or a luminance value calculated from the RGB values), Input refers to the RGB values for the input pixel, and the ColorSaturation parameter may be set based on the desired performance of the color correction. For example, when ColorSaturation is set to zero, the Color SAT output will include only black and white values. Although not shown explicitly, the Color SAT variable includes values corresponding to each of the R, G, and B input values used to define the input pixel. As above, the ColorSaturation parameter may be set by an application developer, or some other appropriate way, to achieve the desired performance of the display adjustment.

The second stage of the color correction operation includes a gamma correction operation, a lift adjustment, and a gain adjustment. These operations may use different parameters than the first color correction operation. The second color correction operation is performed in some embodiments using the following equation:

$$\text{ColorOut} = (\text{ColorSAT}^{ColorGamma} + \text{ColorLift}) \cdot \text{ColorGain} \quad (6)$$

where ColorSAT refers to the RGB values for the input pixel after saturation control has been performed using equation (4), and ColorGamma, ColorLift, and ColorGain are parameters that may be set based on the desired performance of the color correction operation. Although not shown explicitly, the ColorOut variable includes values corresponding to each of the R, G, and B input values used to define the input pixel.

As above, the parameters ("ColorGamma", "ColorLift", and "ColorGain") that define the properties of this color correction operation may be set by an application developer in some embodiments such that the display adjustment of the UI is optimized. In other embodiments, similarly to the amplification parameter and first color correction parameters described above, an end-user may be able to adjust the parameters either directly or indirectly.

After performing (at 560) the second color correction operation, the process blends (at 570) the output from the first color correction operation and the output from the second color correction operation based on the amplified and limited saturation value calculated for the input pixel. Some embodiments perform this blend operation using the following equation:

$$\text{Output} = \text{GrayOut} \cdot (1 - \text{Mask}) + \text{ColorOut} \cdot \text{Mask} \quad (7)$$

where GrayOut includes the RGB values calculated using equation (4), ColorOut includes the RGB values calculated using equations (5) and (6), and Mask is the amplified and limited saturation level calculated using equation (3). Thus, the Output varies linearly from the GrayOut values (when Mask=0) to the ColorOut values (when Mask=1). In the range of Mask values between 0 and 1, the Output values are made up from a weighted addition of the GrayOut values and the ColorOut values.

When the Mask value (or amplified and limited saturation value) is 0, indicating the lowest level of color saturation, the output is provided completely by the first color correction operation (i.e., Output=GrayOut). When the Mask value is 1, indicating the highest level of color saturation, the output is provided completely by the second color correction operation (i.e., Output=ColorOut). When the Mask value is between 0 and 1, indicating a saturation value between the minimum and maximum, the output is a weighted combination of the GrayOut and ColorOut RGB values.

After performing (at 570) the blend of the two color correction outputs, the process blends (at 580) the output from the blend of the color correction outputs and the original input pixel values based on the display adjustment parameter. Some embodiments perform this blend operation using the following equation:

$$\text{FinalOut} = \text{Input} \cdot (1 - \text{Bias}) + \text{Output} \cdot \text{Bias} \quad (8)$$

where Output includes the RGB values calculated using equation (7), Input includes the RGB values of the input pixel, and Bias is a display adjustment parameter that ranges from 0 to 1. Thus, the Output varies linearly from the Input values (when Bias=0) to the Output values (when Bias=1). In the range of Bias values between 0 and 1, the FinalOut values are made up from a weighted addition of the Input values and the Output values.

When the Bias is 0 (e.g., when a slider control such as 140 shown in FIG. 1 is placed at its minimum value), the FinalOut is the same as the original Input. When the Bias value is 1 (e.g., when a slider control such as 140 shown in FIG. 1 is placed at its maximum value), the output is provided completely by the blended color correction outputs (Output). When the Bias value is between 0 and 1, indicating a display adjustment value between the minimum and maximum, the output is a weighted combination of the Input and Output values.

In this manner, a user is able to set a single parameter (i.e., "Bias" in the above example) that controls the display adjustment of the UI. The Bias parameter may be set by a user in a variety of ways. For instance, the slider control 140 shown in the example of FIG. 1 is one way a user may set the Bias parameter to the appropriate value between 0 and 1. Alternatively and/or conjunctively, a user may perform a series of keystrokes, make a pull-down or pop-up menu selection, or perform some other appropriate action to set the Bias parameter. In addition, in some embodiments the Bias parameter may be automatically generated by sensing and responding to ambient light conditions, or through some other automated method.

After blending (at 580) the output from the blend of the color correction outputs and the original input pixel values, the process ends. In some embodiments, the process 500 may be run for each pixel in the input image. Such operation was described above in reference to process 200.

Although the process 500 has been described using specific examples and with reference to certain features, actions, and details, one of ordinary skill in the art will recognize that the process may be implemented using other specific embodiments without departing from the spirit of the invention. For instance, the process may be optimized such that only one color correction operation is performed when the saturation level is at 0 or 1. As another example, some embodiments may not perform process 500 at all when the bias parameter is determined to be 0. In addition, some embodiments may receive input pixels in different color formats, and perform an appropriate color space transformation to generate YIQ color space values. Some embodiments may perform a transformation to another appropriate color space, such as YUV or YCbCr (i.e., a color space that separates a luminance value from chrominance values, allowing color saturation to be calculated independently of brightness). Furthermore, in some embodiments process 500 may be performed completely separately from process 200, or embedded into process 200 at a different location than described above.

In addition, although the process 500 has been described as operating on a single pixel at a time, in some embodiments multiple pixels are processed at once. These multiple pixels may include so called "artwork" (e.g., buttons or other UI features defined by a set of pixels), or other groupings of pixels (e.g., groupings of pixels based on the limitations of the available image processing capabilities, such as cache size). Furthermore, although the process has been described as performing particular color correction operations, one of ordinary skill will recognize that different embodiments may use one or more different types of color correction operations (e.g., using a gamma curve, a sine curve, a power curve, etc.). In some embodiments, these alternative color correction operations may be selected by an end-user, or the selection may be based on some criteria defined by the application developer or some other appropriate criteria.

C. Operational Flow and Image Compositing

Figure 8:
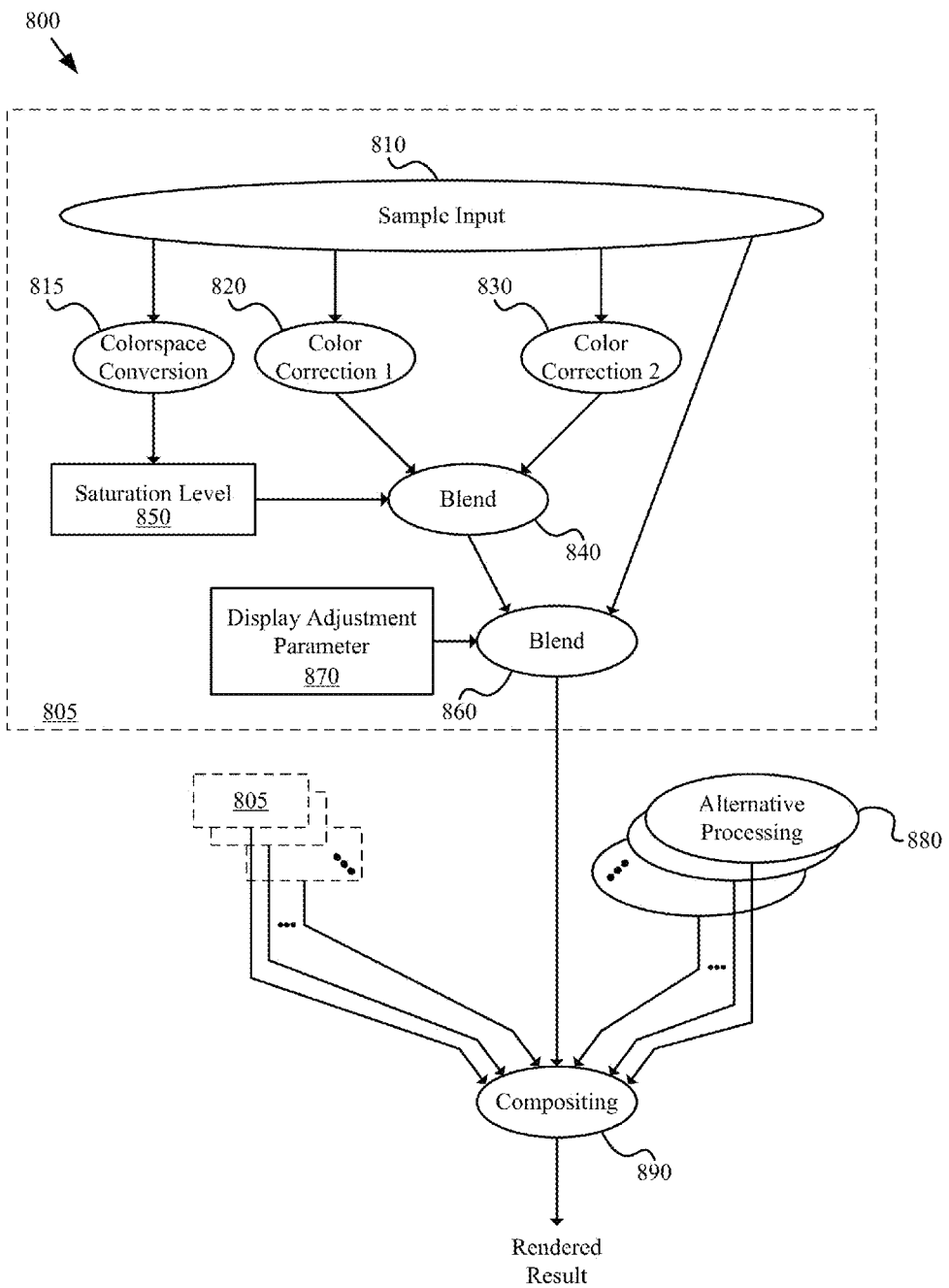
FIG. 8 illustrates one example of an image-processing operational tree diagram.

FIG. 8 illustrates one example of an image-processing operational tree diagram 800. Specifically, the operational tree diagram describes a set of operations performed on a sample RGB input value. The operations shown in FIG. 8 will be described with reference to FIGS. 5 and 9.

Figure 9:
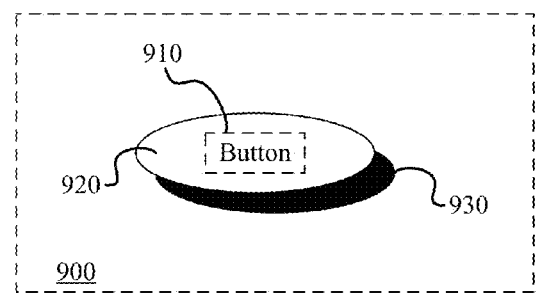
FIG. 9 illustrates one example of a multi-layer UI item.

FIG. 9 illustrates one example of a multi-layer UI item 900. Specifically, this figure shows a UI item 900 that includes multiple layers 910-930 of image data (i.e., a text layer 910, a button color layer 920, and a drop-shadow layer 930. Different UI items may be defined with various different layers (e.g., artwork, color, texture, etc.). The various layers (e.g., layers 910-930) may then be composited to generate the complete UI item for display.

As shown in FIG. 8, the processing tree 800 includes various individual image-processing operations 810-840, 860, and 890, different calculated or received parameters 850 and 870 used to direct those operations, sets of image processing operations 805 performed based on a display adjustment parameter, and alternative sets of processing operations 880 that are performed without reference to the display adjustment parameter.

As shown in FIG. 8, the processing tree 800 begins by performing a sample input operation 810. Such a sample input operation may include receiving a color value for a pixel, retrieving a pixel value from an input image, receiving a pixel value from storage, etc. The sampled input is then passed to a colorspace conversion operation 815, two different color correction operations 820 and 830, and a blend operation 860. The colorspace conversion 815 represents the same conversion described above in reference to operation 520 of process 500. The first color correction operation 820 is the same color correction described above in reference to operation 550 of process 500. The second color correction operation 830 is the same color correction described above in reference to operation 560 of process 500.

After the sample input operation, the colorspace conversion operation 815 performs a conversion from the received colorspace (e.g., RGB colorspace) to the desired colorspace (e.g., YIQ, YUV, or YCbCr colorspace). The output of the colorspace conversion operation 815 is the amplified and limited saturation level 850. This saturation level is the same saturation level that was calculated using equations (2)-(3) as described above in reference to operations 520-540 of process 500.

In addition to the colorspace conversion operation 815, the processing tree performs color correction 1 820 and color correction 2 830 to the sampled input. These color correction operations 820 and 830 are performed using equations (4)-(6) as described above in reference to operations 550-560 of process 500. As shown in FIG. 8, the outputs of the color correction operations 820 and 830 are passed to a blend operation 840. The blend operation is the same blend operation described above in reference to operation 570 of process 500. As shown, the blend operation 840 is controlled by the saturation level 850 calculated by the colorspace conversion operation 815. Thus, as described above in reference to operation 570, the blend operation 840 generates an output that is a weighted combination of the outputs of color correction 1 820 and color correction 2 830, based on the saturation level 850 of the pixel being processed.

The output of the blend operation 840, as well as the output of the sample input operation 810 are passed to the blend operation 860. The blend operation 860 is the same blend operation described above in reference to operation 580 of process 500. As shown, the blend operation 860 is controlled by the display adjustment parameter 870. Thus, as described above in reference to operation 580, the blend operation 860 generates an output that is a weighted combination of the outputs of blend operation 840 and the sample input operation 810, based on the display adjustment parameter 870.

The output of blend operation 860 is then provided to the compositing operation 890. In addition, the compositing operation receives inputs from various alternative sets of image processing operations 805 performed based on the display adjustment parameter 870 and various alternative sets of image processing operations 880 performed without reference to the display adjustment parameter 870. The compositing operation then produces the final rendered result as its output.

Thus, referring to the example of FIG. 9, the text layer 910 of button 900, for example may be processed using operation set 805, based on a display adjustment parameter. In some embodiments, all pixels in the text layer 910 are processed through a set of operations (e.g., 805) before being passed to the compositing operation 890.

The button color layer 920 of button 900, on the other hand, may be processed using an alternative set of processing operations 880 that are not affected by the value of the display adjustment parameter 870. In this manner, an application may process different UI items using different sets of processing operations. For instance, content display areas, for example, may be processed using one set of image processing operations, while other UI items are processed using a second set of image processing operations.

The third layer of the button 900, drop-shadow layer 930, may be processed using operation set 805, an alternative processing operation set 880, some other set of image processing operations, or even receive no processing at all before being passed to the compositing operation 890. Thus, the various processing paths allow a developer to completely define the processing that will be performed on not only various UI items, but the various component or layers that make up the UI items. In some embodiments, the content that is displayed in a UI is implicitly masked from particular image-processing operations as these different layers are processed (e.g., through operation set 805), while the content is passed directly to the compositing operation (or receives alternative processing).

One of ordinary skill in the art will recognize that the exemplary image processing tree 800 shown in FIG. 8 may be implemented in various different ways without departing from the spirit of the invention. For instance, some embodiments may process all inputs through the same processing tree. In addition, UI items such as the button 900 shown in FIG. 9 may include various different layers with a different set of processing operations specified for each layer.

II. Display Adjustment Examples

To better explain adjusting the UI display settings for different lighting conditions, several additional examples will now be described by reference to FIGS. 10-15. Specifically, these figures illustrate adjusting display settings of different UIs using different UI controls such as a slider, incremental adjustment control, etc.

Figure 10:
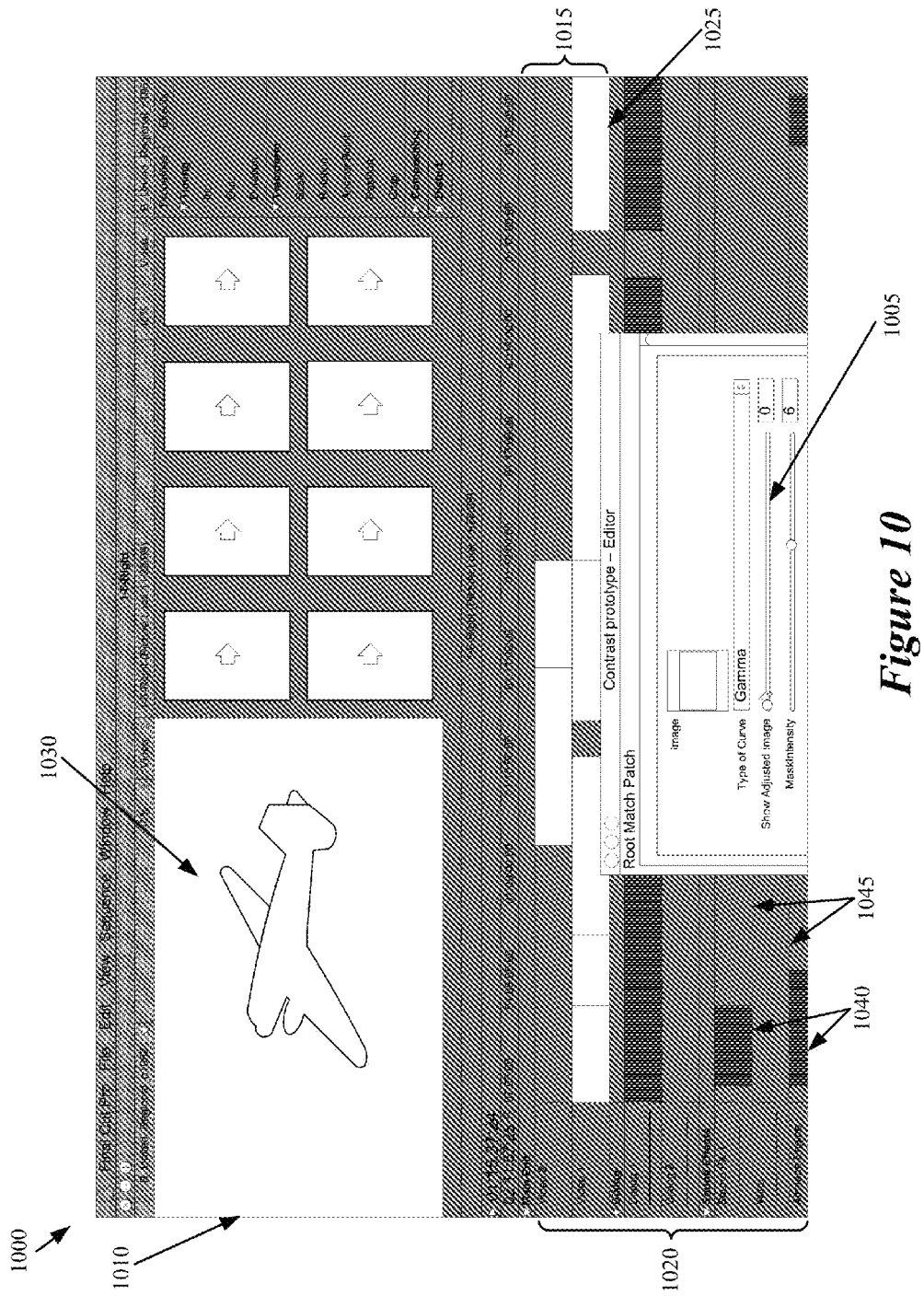
FIGS. 10-12 illustrate adjusting the display setting of a UI of a media editing application by manipulating a slider.
Figure 11:
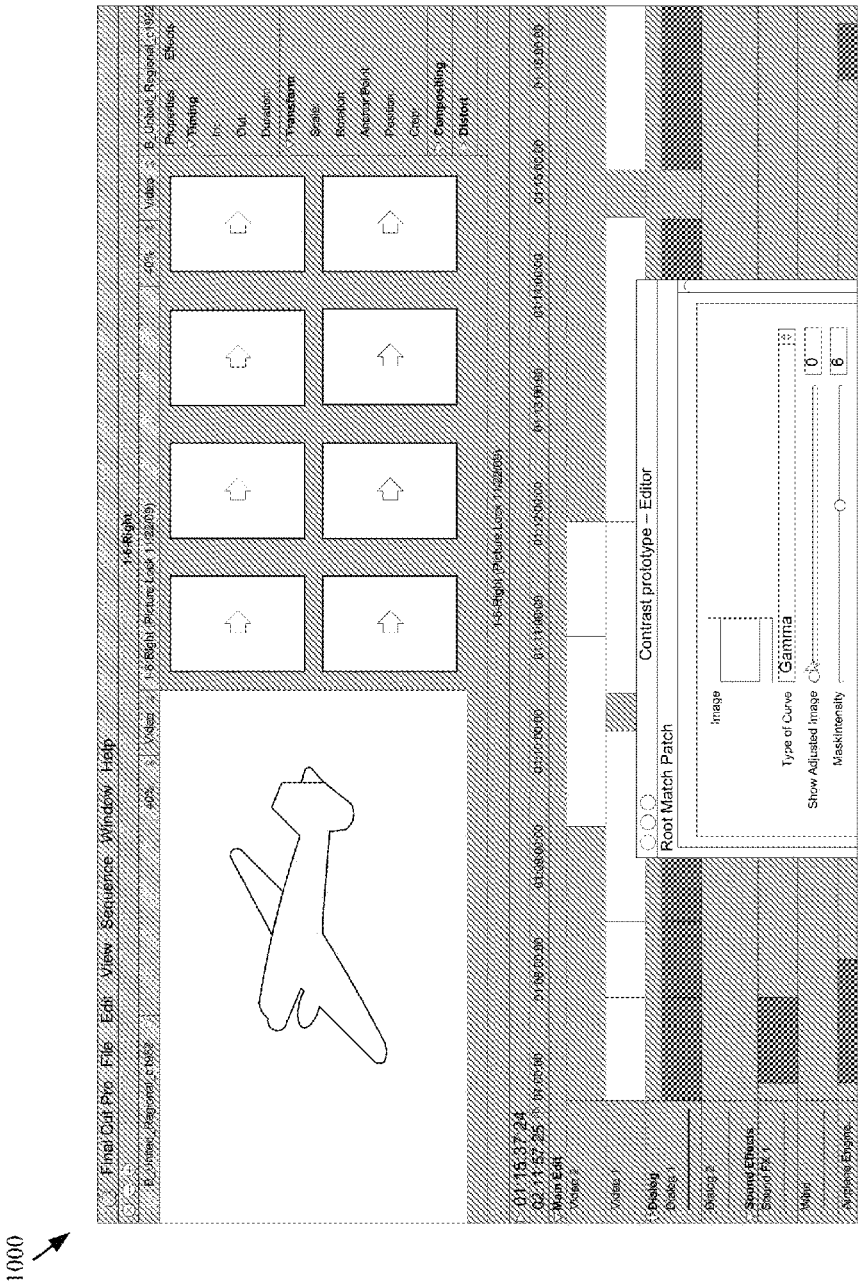
Figure 12:
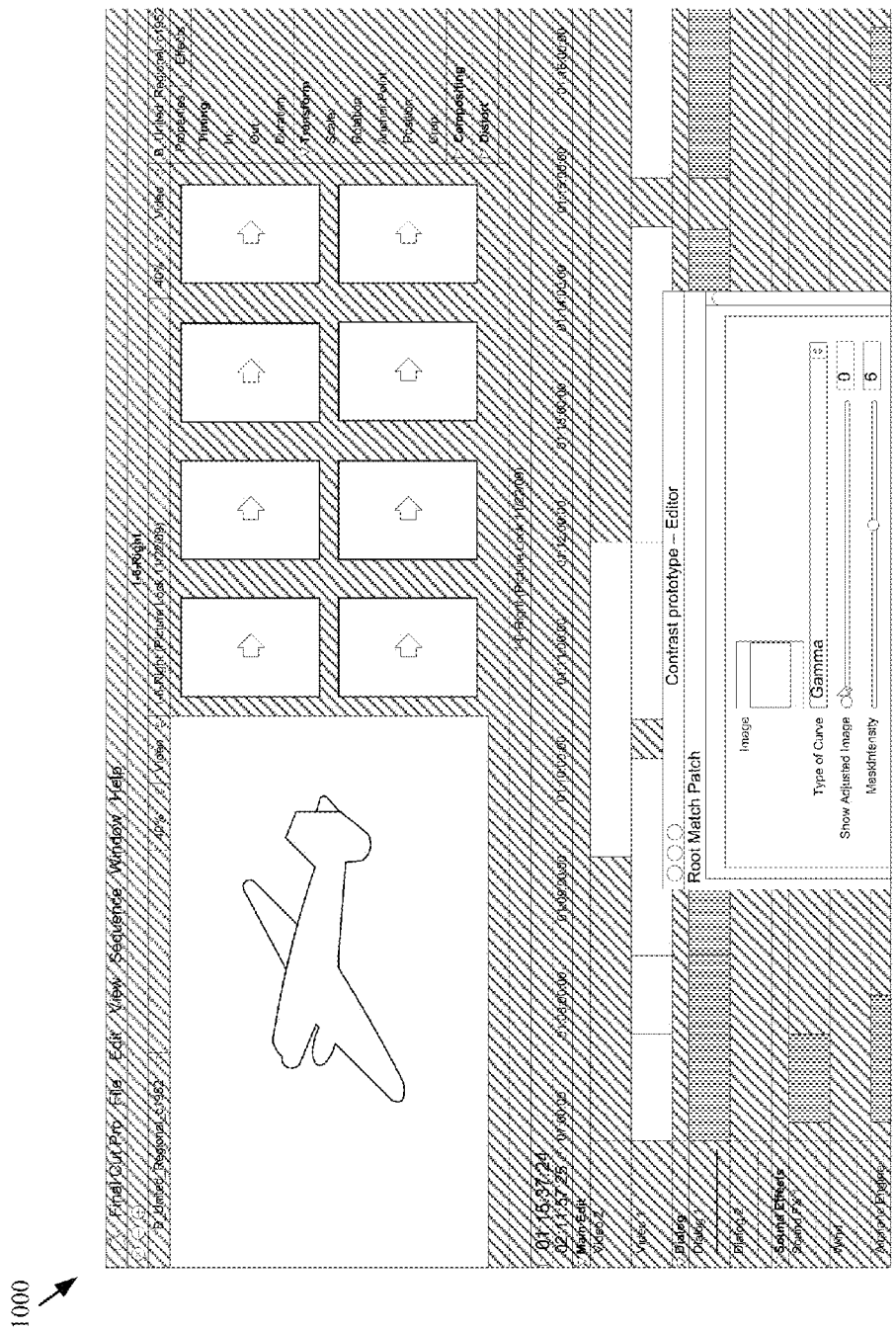

FIGS. 10-12 illustrate adjusting the display setting of a UI 1000 of a media editing application by manipulating a slider 1005. Specifically, these figures illustrate the UI at three different stages: a first stage in which the slider 1005 is positioned at a minimum level, a second stage in which the slider is at a mid-point, and a third stage in which the slider is at a maximum level. As shown, the UI 1000 includes (1) a content display area 1010 that displays a frame of a video clip 1030, (2) a composite display area 1015 that displays thumbnail representations 1025 of several pieces of media clip that are a part of a composite presentation, (3) textual elements 1020 that describes different media clips in the composite presentation, and (4) the slider 1005 for adjusting the display settings of the UI.

The operations of adjusting the UI 1000 for different lighting conditions will now be described by reference to the state of the UI during the first, second, and third stages that are illustrated in FIGS. 10-12. As shown in FIG. 10, in the first stage, the slider 1005 is positioned at its minimum value. That is, the slider 1005 is set at a position that was deemed to be optimal for a particular lighting condition (e.g., daytime, brightly-lit room).

FIG. 11 illustrates the UI 1000 in the second stage after the slider 1005 has been adjusted to a midpoint value. Specifically, this figure illustrates that the adjustment of the slider only affected the luminance characteristics (e.g., saturation, gamma, lift, gain) of certain elements in the UI 1000. As shown, the adjustment of the slider 1005 did not affect the content that is displayed in the UI and only affected elements that are part of the UI. For instance, the adjustment of the slider did not affect the video clip 1030 that is displayed in the content display area 1010 nor the thumbnail representations 1025 in the composite display area 1015. Contrarily, the adjustment affected the background of the composite display area 1015.

FIG. 12 illustrates the UI 1000 in the third stage when the slider 1005 is adjusted to a maximum value. As shown, the adjustment of the slider 1005 has caused the luminance characteristics of the UI to be generally brighter than at the first and second stages. In some embodiments, the range of adjustment settings is defined (e.g., mathematically) such that the change in luminance characteristic does not affect usability of the UI (e.g., by creating artifacts, by making UI elements difficult to perceive). In some such embodiments, the range is defined such that colors of the UI elements do not have to be inverted to be viewed by a user of the UI. For instance, in FIG. 12, although the luminance characteristics of the UI has changed to one that is optimal under a darker lighting condition than at the first and second stages, the color of the textual elements 1020 is not inverted. In addition, some embodiments perform the display adjustment such that brightly-colored UI items (e.g., UI items 1040) are not affected as much as dully-colored or grayscale UI items (e.g., UI items 1045) when the display is adjusted.

Figure 13:
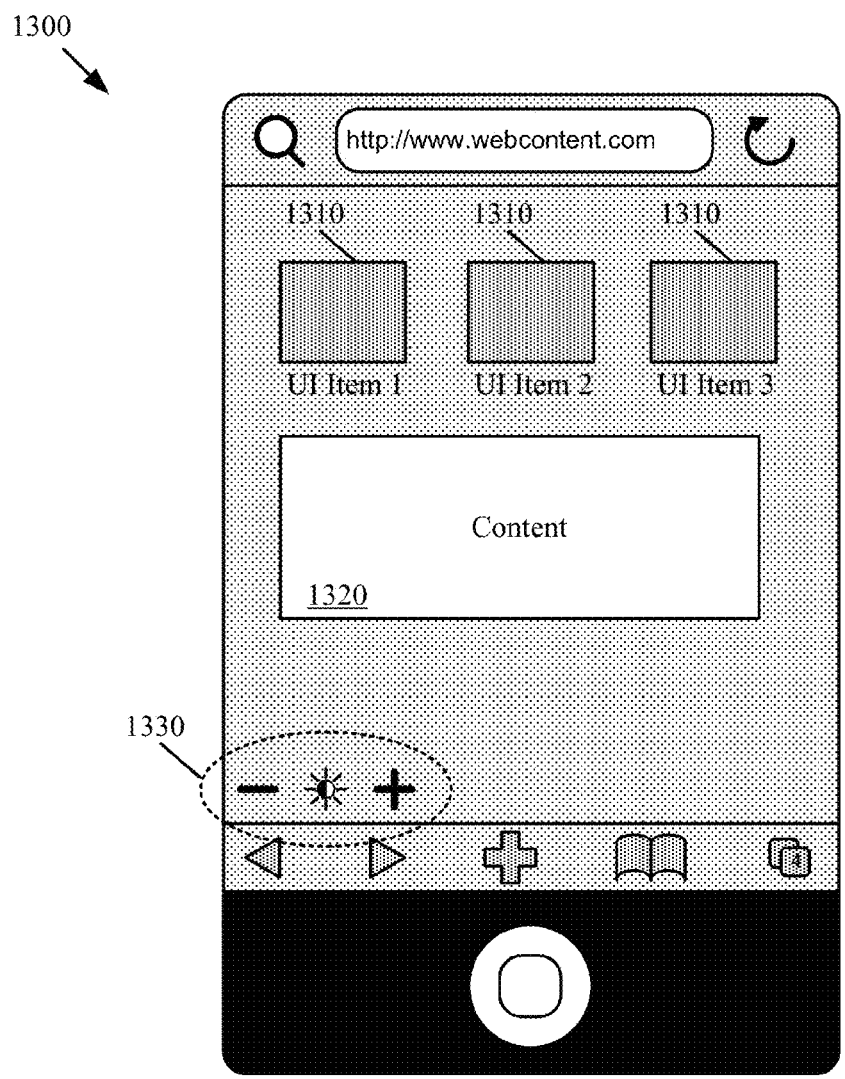
FIGS. 13-15 illustrate adjusting the display setting of a touch-screen UI by selecting a UI button.
Figure 14:
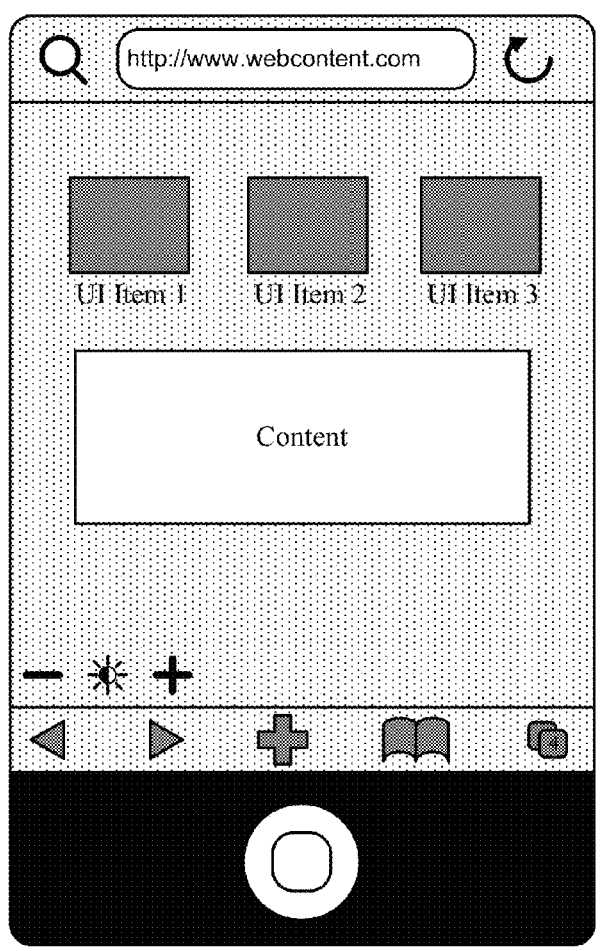
Figure 15:
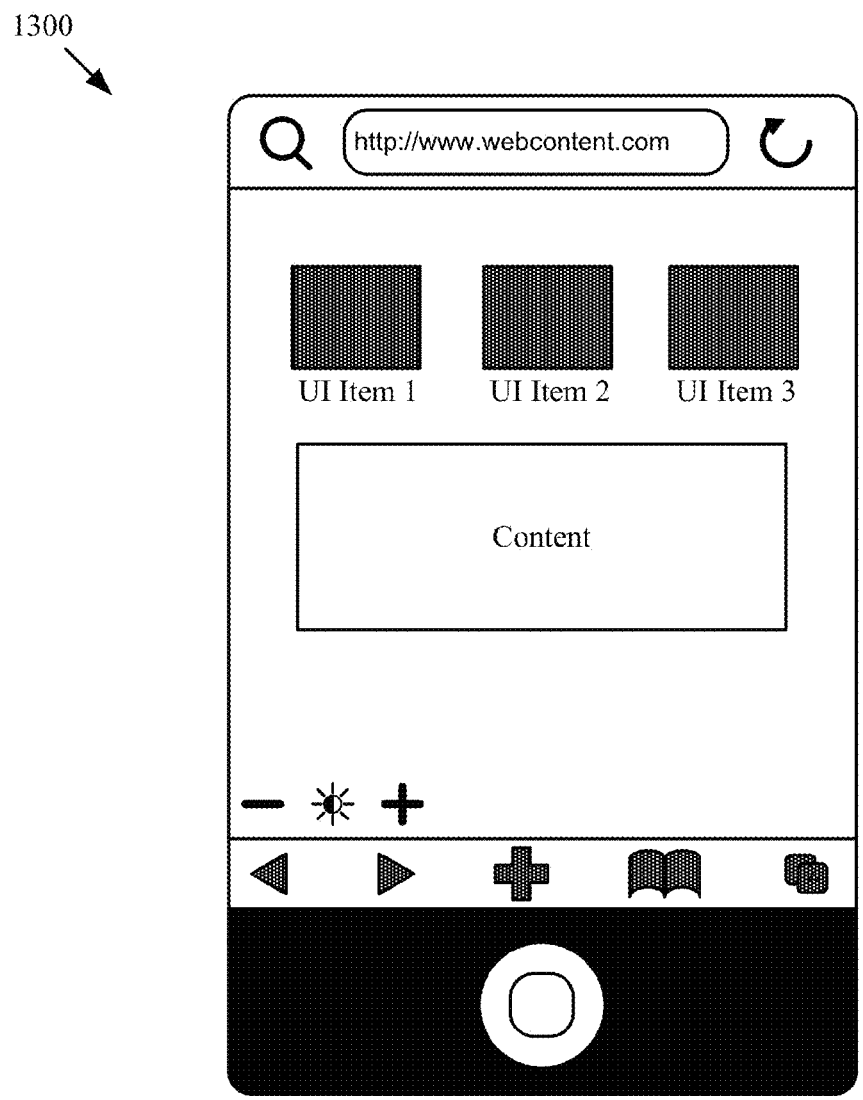

In the previous examples, a slider control was adjusted to change the display setting of a UI for different lighting conditions. FIGS. 13-15 illustrate adjusting the display setting of a touch-screen UI 1300 by selecting a UI button. Specifically, these figures illustrate the UI 1300 at three different stages: a first stage in which the UI 1300 is displayed with a low contrast setting, a second stage in which the UI is displayed with an intermediate contrast setting, and a third stage in which the UI is displayed with a high contrast setting. As shown in FIG. 13, the UI 1300 includes several UI items 1310, a content item 1320, and a contrast control 1330.

The operations of adjusting the UI 1300 for different lighting conditions will now be described by reference to the state of the UI during the first, second, and third stages that are illustrated in FIGS. 13-15. As shown in FIG. 13, in the first stage, the contrast is set to its minimum value (value not shown).

FIG. 14 illustrates the UI 1300 in the second stage when the contrast has been adjusted to a midpoint value (value not shown) using the contrast control 1330 (e.g., by repeatedly pressing the "+" section of the control). Alternatively or conjunctively, some embodiments may automatically adjust the contrast using input from a light sensor. Automatic adjustment of display parameters based on ambient lighting will be described in more detail in sub-section IV.B below. Specifically, this figure illustrates that the adjustment of the slider has, for instance, increased the contrast between the UI items 1310 and the background of the UI. As above, the adjustment of the contrast control 1330 did not affect the content 1320 that is displayed in the UI 1300 and only affected elements that are part of the UI.

FIG. 15 illustrates the UI 1300 in the third stage when the contrast has been adjusted to a maximum value. As shown, the adjustment caused a further increase in the contrast between the UI items 1310 and the background of the UI. Again, the adjustment of the contrast did not affect the content 1320 displayed in the UI 1300. Although not shown in this example, the UI 1300 may also include various items that are adjusted differently depending on their respective color saturation levels.

In some embodiments, the range of adjustment settings is defined (e.g., mathematically) such that the change in luminance characteristic does not affect usability of the UI (e.g., by creating artifacts, by making UI elements difficult to perceive). In some such embodiments, the range is defined such that colors of the UI elements do not have to be inverted to be viewed by a user of the UI.

Although the adjustment of the UI display has been described with reference to specific examples and features, one of ordinary skill in the art will recognize that the UI display adjustment may be performed using other UIs, other display controls, etc. For instance, some embodiments may adjust the UI display using pull-down menu selections. As another example, some embodiments may adjust the UI display using dedicated brightness control keys (e.g., as provided on many keyboards). In addition, various UIs may have various different UI items, display features, content display areas, etc.

III. Performance Enhancement

Some embodiments cache UI items (e.g., icons, buttons, menus, etc.) to improve application performance when adjusting UI display settings. In some embodiments, the cache stores UI elements that were previously stored elsewhere or previously calculated. Once the UI items are stored in the cache, they can be used again by accessing the cached copies rather than re-fetching or re-computing (e.g., pixel processing) the UI items stored on disk. Caching improves overall performance as cached UI items, having been previously processed, do not need to receive pixel processing. In addition, when storing the cached UI items in, for example, random access memory (RAM), the access time for retrieving data previously stored in the cache is less costly than the access time for retrieving data from disk. Furthermore, in some embodiments, the cache is shared across multiple applications.

Figure 16:
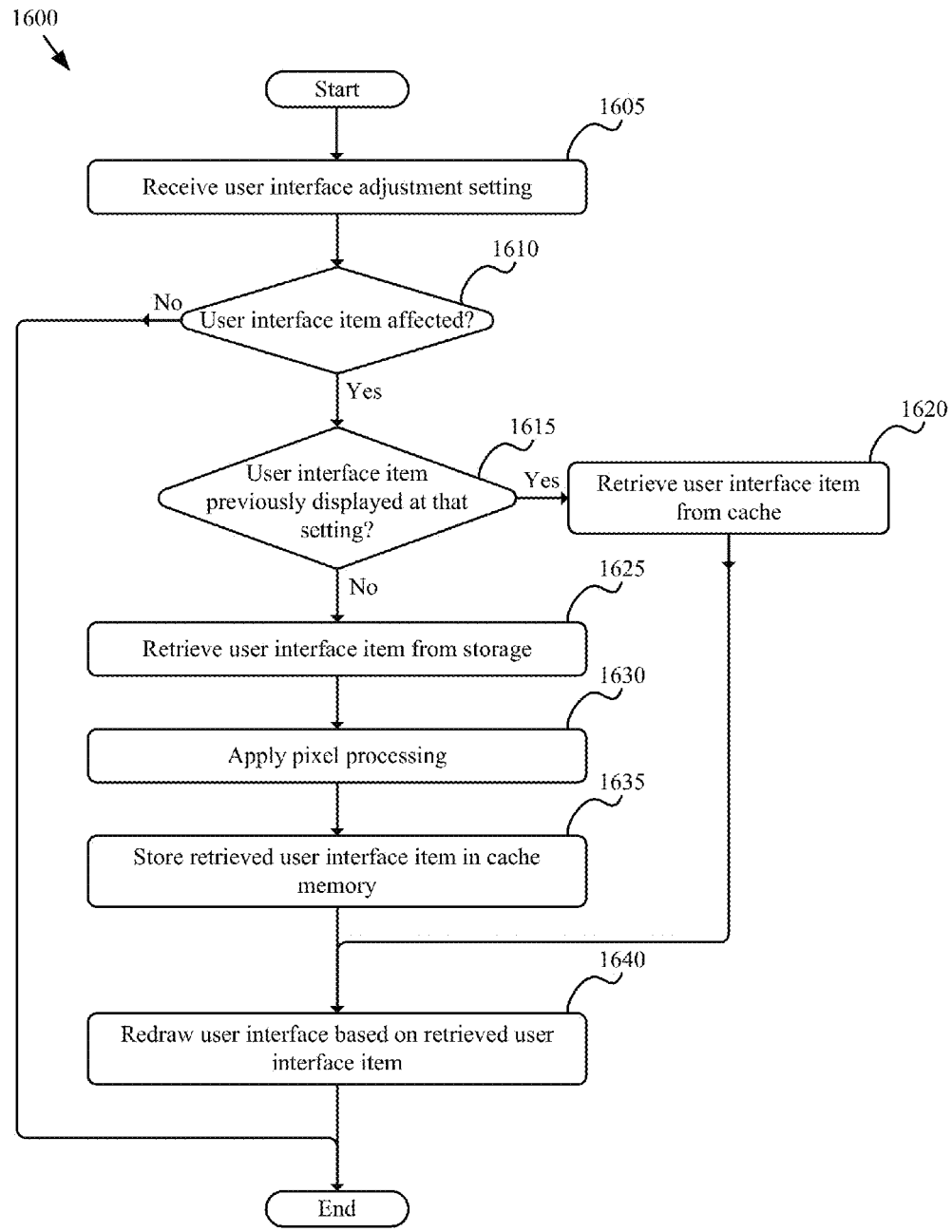
FIG. 16 conceptually illustrates a process for redrawing a UI on a display screen based on a UI item stored in cache or disk.

FIG. 16 conceptually illustrates a process 1600 for redrawing a UI on a display screen based on a UI item stored in cache or disk. In some embodiments, the process is performed by an application and/or one or more components (e.g., cache monitor, display adjustment module, etc.) associated with the application executing on a computing device. This process will be described by reference to FIG. 17 which illustrates various different UI items stored in disk and cache. As shown, the process 1600 begins (at 1605) by receiving a UI adjustment setting. The process then determines (at 1610) whether a UI item is affected by the adjusted setting. When the adjusted setting does not affect any UI item, the process ends. Otherwise, the process proceeds to 1615.

At 1615, the process determines whether the UI item affected by the adjusted display setting was previously displayed or cached at that display setting. When the determination is made that the UI item was previously displayed or cached at that display setting, the process retrieves (at 1620) the UI item from the cache. Otherwise, the process retrieves (at 1625) the UI item from the disk.

Figure 17:
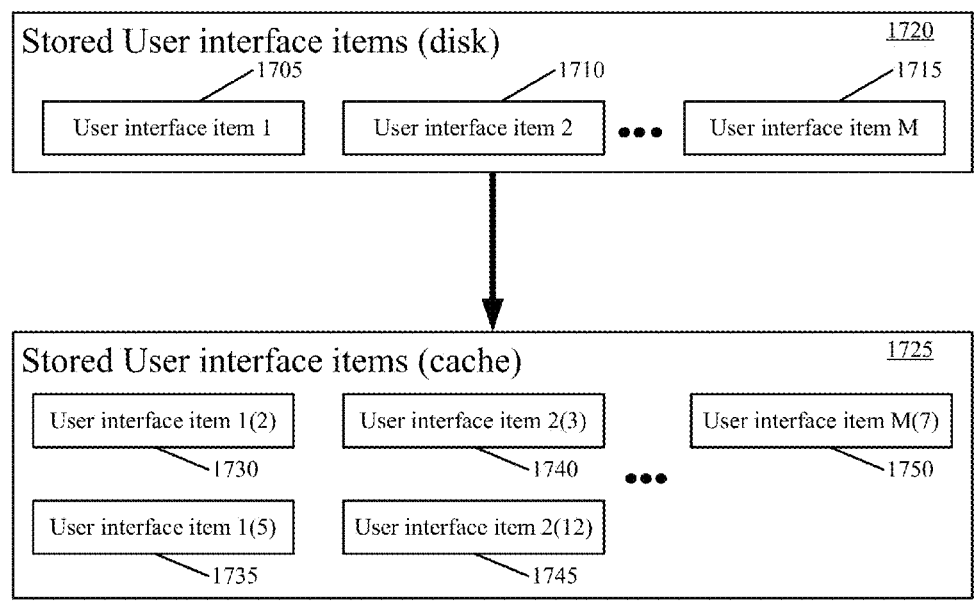
FIG. 17 illustrates various different UI items stored in disk and cache.

To facilitate performance enhancement, some embodiments store, in cache, multiple versions of a UI item for different UI display settings. This allows the UI item to be loaded directly from cache without having to dynamically process the UI item each time it is loaded. FIG. 17 illustrates various different UI items stored in disk and cache. As shown, the figure includes UI item 1 1705, UI item 2 1710, and UI item M 1715 stored in disk 1720.

After retrieving (at 1625) the UI item from storage, the process applies (at 1630) pixel processing to the UI item. After applying pixel processing to the UI item, the process (at 1635) stores the UI item in cache memory. This is illustrated in FIG. 17 as several UI items, each representing a different specific display setting, or range of display settings, are loaded onto the cache 1725. Specifically, this figure illustrates that the UI item 1 at settings 2 1730 and 5 1735, the UI item 2 at settings 3 1740 and 12 1745, the UI item M at setting 7 1750, and several other UI items have previously been loaded to the cache 1725.

By loading the UI items for different settings into cache memory, the processing time for changing the UI display setting is improved as the different versions do not have to be reprocessed and/or retrieved again from disk. Once the UI item is retrieved either from storage or cache, the process 1600 then redraws (at 1640) the UI based on the retrieved UI item. The process then ends.

One of ordinary skill in the art will realize that not all features for redrawing the UI need to be used together. Accordingly, some embodiments perform variations on the process 1600. For example, some embodiments might not determine whether the UI item is affected and might only determine whether the UI item was previously stored for a particular setting. Also, in some embodiments the operations of process 1600 might be performed by two or more separate processes. That is, some embodiments could have one process for retrieving the UI item from cache and a separate process for retrieving the UI item from storage.

IV. Software Architecture

A. Software Architecture of an Application

Figure 18:
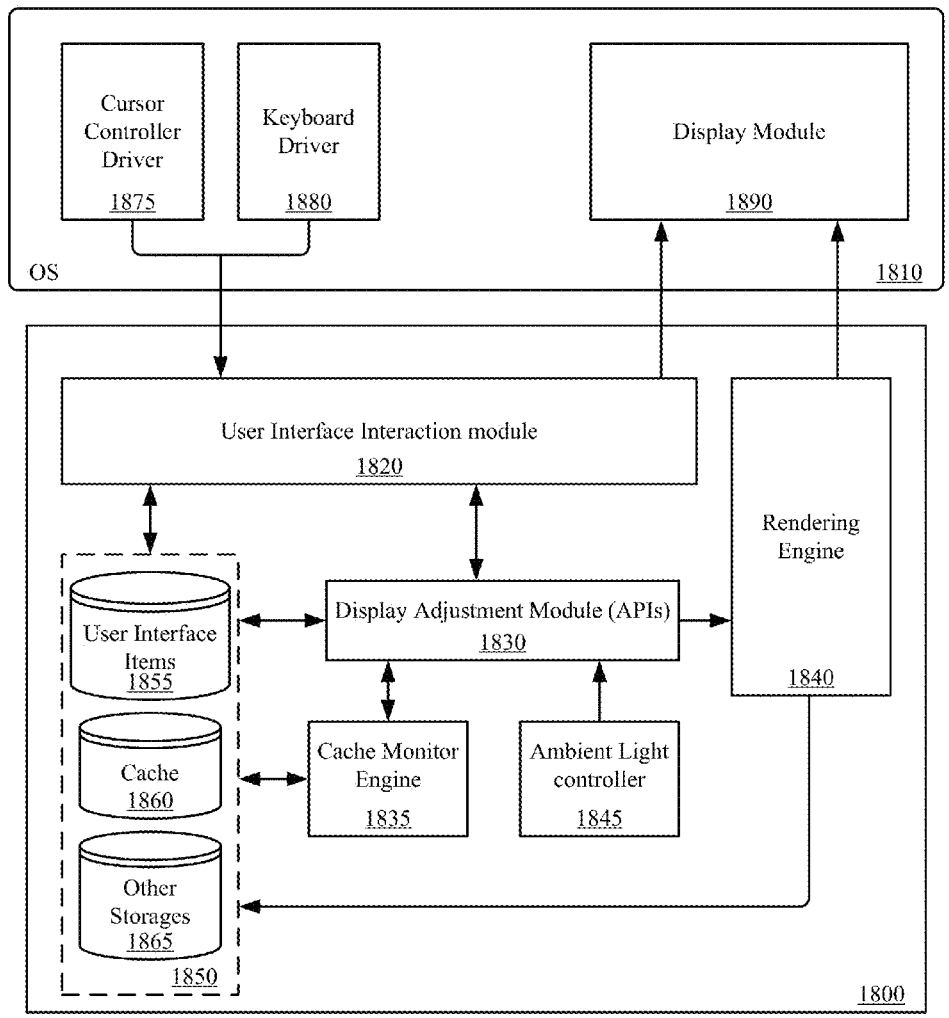
FIG. 18 conceptually illustrates the software architecture of an application of some embodiments for adjusting a display of presenting menus such as those described in the preceding sections.

In some embodiments, the processes described above are implemented as software running on a particular machine, such as a computer or a handheld device, or stored in a computer readable medium. FIG. 18 conceptually illustrates the software architecture of an application 1800 of some embodiments for adjusting a UI display such as those described in the preceding sections. In some embodiments, the application is a stand-alone application or is integrated into another application (e.g., application 1800 might be a portion of a video-editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine.

As shown in FIG. 18, the application 1800 includes a UI interaction module 1820 for interacting with a user of the application, a display adjustment module 1830 for adjusting the display of the UI, a cache monitor engine 1835 for monitoring stored UI items in one or more caches, an ambient light controller 1845 for dynamically adjusting the display based on sensed ambient light, and a rendering engine 1840 for generating image data for storage or display. The application 1800 may also access a set of storages 1850. The set of storages includes storages for UI items 1855, content data 1860, as well as other data 1865 (e.g., media content data, display parameters, etc.).

The operating system 1810 of some embodiments includes a cursor controller driver 1875 that allows the application 1800 to receive data from a cursor control device, a keyboard driver 1880 that allows the application 1800 to receive data from a keyboard, and a display module 1890 for processing video data that will be supplied to a display device (e.g., a monitor).

A user interacts with items in a UI of the application 1800 via input devices (not shown) such as a cursor controller (e.g., a mouse, touchpad, trackpad, etc.) and/or keyboard. The input from these devices is processed by the cursor controller driver 1875 and/or the keyboard driver 1880. The present application describes UIs that provide users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the UI to control (e.g., select, move) objects in the UI. However, in some embodiments, objects in the UI can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the UI that is displayed on the display of the touch screen device. For instance, a user can select a particular object in the UI by simply touching that particular object on the display of the touch screen device. As such, when touch control is utilized, a cursor may not even be provided for enabling selection of an object of a UI in some embodiments. However, when a cursor is provided in a UI, touch control can be used to control the cursor in some embodiments.

When a user interacts with a UI control to change the display settings, some embodiments translate the user interaction into input data and send this data to the display adjustment module 1830. For example, when the user interacts with a control to change the UI display settings from a low ambient light setting to a high ambient light setting, the UI interaction module 1820 may translate the settings and pass the translated settings to the display adjustment module 1830.

The display adjustment module 1830 of some embodiments includes various application programming interfaces (APIs) for processing display settings and/or commands received from the UI interaction module 1820. The display setting or command is then processed by the display adjustment module to adjust the display setting of the UI. The display adjustment module 1830 may also interface with one or more storages to load UI items (e.g., icons, UI controls, etc). The display adjustment module 1830 may also interface with the cache monitor engine 1835 to load such UI items from cache 1860.

The computing device (e.g., notebook computer, desktop computer, portable devices) may include one or more light sensors configured to receive and measure the level of light that surrounds the computing device during use, as for example, light that is produced by incandescent, sunlight, fluorescents, and the like. This type of light is sometimes referred to as "ambient light." In some embodiments, the display settings of the UI are automatically adjusted based on ambient light. To facilitate such auto-adjustment, the ambient light controller 1845 reads the measure light and determines a display setting for the UI based on the measured light. The display setting is then passed to the display adjustment module 1830 to automatically adjust the display setting of the UI based on the measured light.

In some embodiments, the cache monitor engine 1835 monitors stored UI items in one or more caches. For instance, the cache monitor engine of some embodiments monitors UI items that are loaded in either disk or cache to improve overall performance when changing display settings of the UI.

Rendering engine 1840 enables the storage or output of audio and video from the application 1800. For example, rendering engine 1840 uses stored UI items (e.g., in cache, disk) to render the UI. As such, the rendering engine receives, in some embodiments, data from the display adjustment module 1830 so that the UI can be displayed according a specified setting. Alternatively, data may be passed from the rendering engine 1840 to the set of storages 1850 for later display.

Although the application 1800 and its features have been described using several specific embodiments, other embodiments might implement the application or its features using different resources or by placing the various modules in different specific locations. For instance, while many of the features have been described as being performed by one component (e.g., the UI interaction module 1820, display adjustment module 1830), one of ordinary skill would recognize that a particular component might be split up into multiple components, and the performance of one feature might even require multiple components in some embodiments.

B. Automatic Adjustment of User Interface Display Setting

As mentioned above, a computing device (e.g., notebook computer, desktop computer, portable devices) may include or be coupled to one or more light sensors configured to receive and measure level of light that surrounds the computing device. For instance, a desktop computer may be coupled with a keyboard that includes one or more light sensors. Alternatively, a mobile smart device may include such a light sensor on a display screen or keypad. Such light sensors may produce one or more signals that specify the light conditions as measured by the sensor. In some embodiments, the display setting of a UI is automatically adjusted based on light measured from one or more such light sensors.

Figure 19:
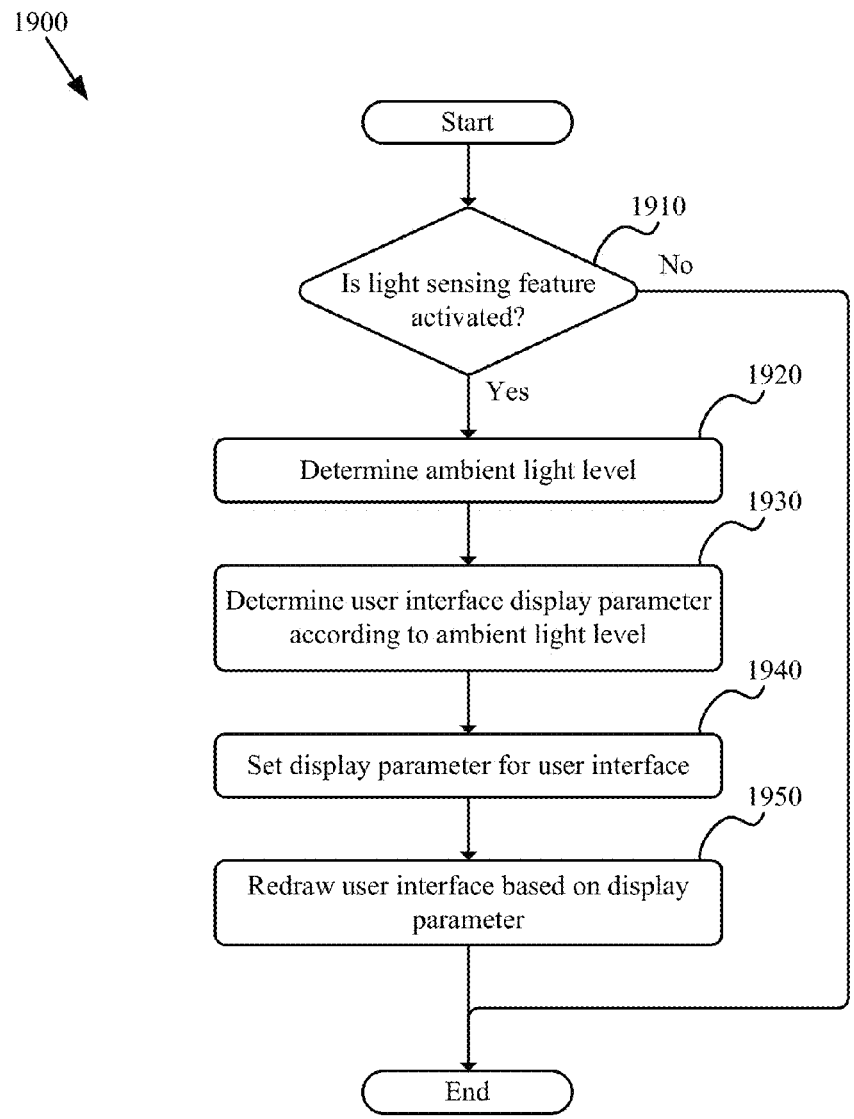
FIG. 19 conceptually illustrates a process for automatic adjusting display settings of a UI based on ambient light.

FIG. 19 conceptually illustrates a process 1900 for automatically adjusting display settings of a UI based on ambient light (e.g., light that surrounds a computing device during use). In some embodiments, the process is performed by the application 1800 described above by reference to FIG. 35. Process 1900 will now be described by reference to FIGS. 20 and 21.

As shown, the process 1900 begins (at 1910) by determining whether the light sensing feature is activated. For example, an application or an operating system may have a UI option (e.g., check box, button, slider) for specifying an auto-adjustment setting for the UI. When the process determines that the light sensing feature is not activated, the process ends. Otherwise, the process proceeds to 1920.

Figure 20:
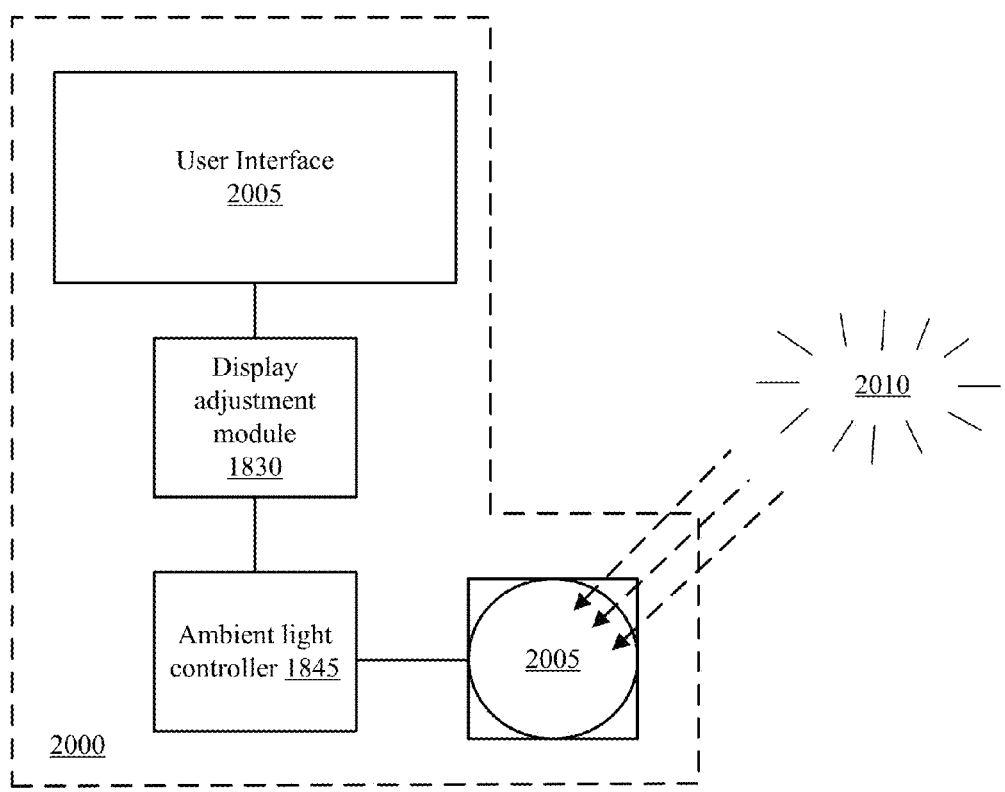
FIG. 20 illustrates an example of automatically adjusting a UI based on the ambient light level.

At 1920, the process 1900 determines an ambient light level. FIG. 20 illustrates an example of automatically adjusting a UI based on the ambient light level. As shown, the figure includes a computing device 2000 that includes a light sensor 2005. The computing device further stores the ambient light controller 1845, the display adjustment module 1830, and a UI 2005. The light sensor 2005 is configured to receive and measure the level of light 2010 that surrounds the computing device 2000 during use. In some embodiments, the ambient light controller 1845 determines the ambient light level based on the measured level of light from the light sensor 2005.

Once the ambient light level is determined, the process 1900 then determines (at 1930) a UI display parameter according to the ambient light level. In the example illustrated in FIG. 20, the ambient light controller determines the UI display parameter and passes the determined parameter to the display adjustment module 1830.

Figure 21:
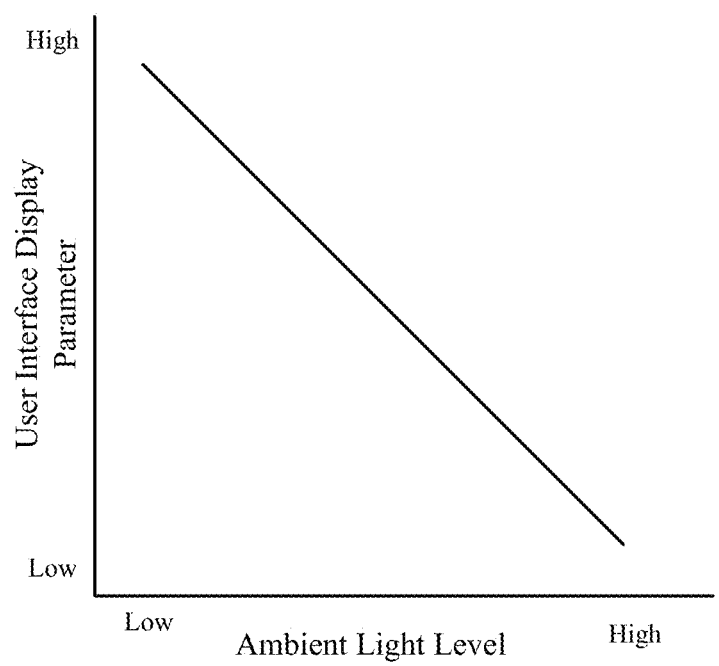
FIG. 21 provides an illustrative example of adjusting the display setting of a UI based on the level of ambient light.

FIG. 21 provides an illustrative example of adjusting the display setting of a UI based on the level of ambient light. Specifically, this figure illustrates that as the ambient level goes up, the display setting of the UI (e.g., contrast, brightness, etc.) goes down in some embodiments. For instance, the UI may be made generally brighter during nighttime or a non-optimally lit room than at daytime or brightly lit room. Once the display parameter for the UI is set, process 1900 redraws or renders (at 1950) the UI based on the display parameter and ends. As mentioned above, this operation may entail rendering UI items from disk and/or cache memory.

In some embodiments, process 1900 may be continuously performed by the application generating the UI display. In other embodiments, the process may be performed at regular intervals (e.g., every 2 minutes). In still other embodiments, the process 1900 may be performed when a change is ambient lighting conditions occurs and is sensed by the ambient light controller 1845 through a light sensor 2005.

One of ordinary skill in the art will realize that not all features for automatically adjusting a UI based on a measured level of light need to be used together. Accordingly, some embodiments perform variations on the process 1900. For example, some embodiments might not determine whether a light sensing feature is enabled or disabled. Hence, in some embodiments, the process 1900 might use other factors to estimate the ambient light level. For example, in some such embodiments the UI display setting may be automatically adjusted based on time of day.

V. Application Development

Figure 22:
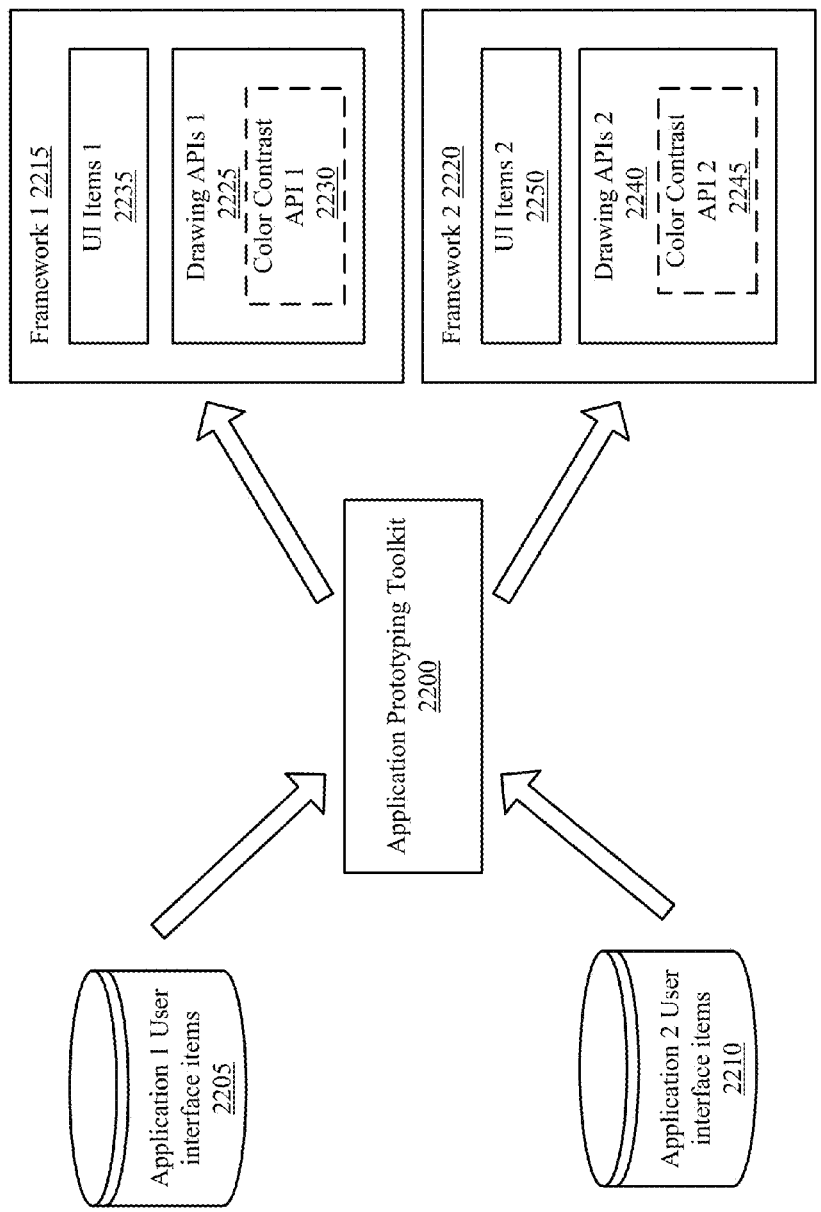
FIG. 22 pictorially illustrates an application toolkit according to some embodiments.

Some embodiments provide an application toolkit that allows developers of different applications to produce different drawing APIs for different applications being developed. FIG. 22 pictorially illustrates an application prototyping toolkit 2200 according to some embodiments. Specifically, this figure illustrates the development of two sets of drawing APIs 2225 and 2240 for two different frameworks 2215 and 2220 based on the UI items stored in storages 2205 and 2210 (each storage 2205 or 2210 corresponding to a particular application or suite of applications). As shown, the drawing APIs 2225 control the display settings of UI items 1 2235, while the drawing APIs 2240 control the display settings of UI items 2 2250. In addition, each group of drawing APIs 2225 and 2240 includes a color contrast API (2230 and 2245, respectively) that performs the color contrast processing described, for example, in reference to FIG. 5 above.

Figure 23:
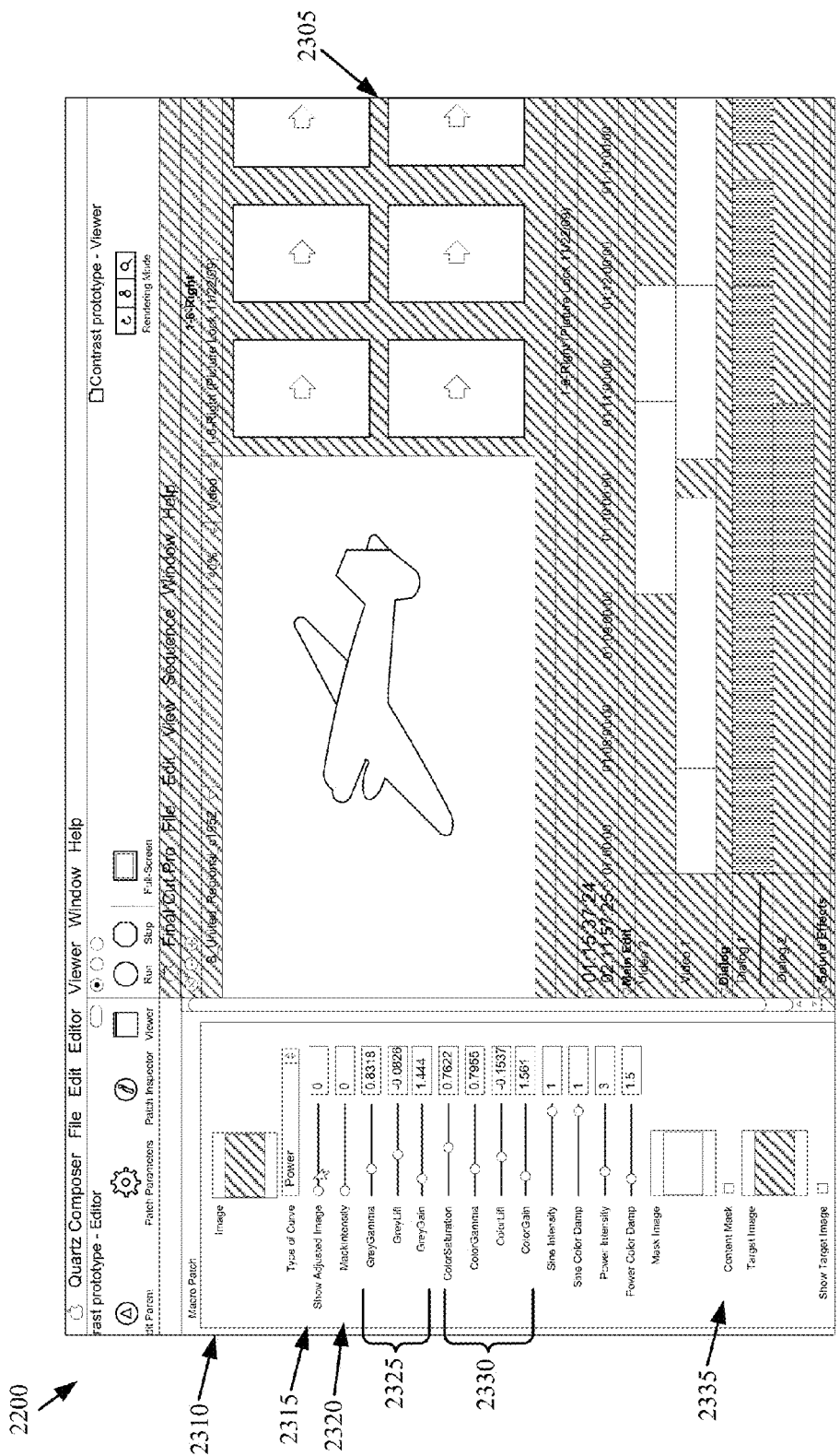
FIG. 23 provides an illustrative example of one such application development toolkit.

FIG. 23 provides an illustrative example of one such application prototyping toolkit. As shown, the application prototyping toolkit 2200 includes a preview display area 2305 and a parameter display area 2310. The preview display area displays a preview of a UI according to the parameters defined in the parameter display area 2310.

The parameter display area 2310 is an area in the application development toolkit 2200 through which a developer can view and modify settings for a set of drawing APIs. Specifically, in this example, the parameter display area 2310 includes (1) an adjusted image slider 2315, (2) a mask intensity slider 2320, (3) a first set of sliders 2325 that defines a first color correction function for applying to non-saturated pixels, (4) a second set of sliders 2330 that defines a second color correction function for applying to saturated pixels, and (5) a content mask check box 2335.

As shown in FIG. 23, the adjusted image slider 2315 represents the control that specifies the parameter which defines the display settings of a UI for different lighting conditions. In some embodiments, the adjusted image slider and/or a variation of it is provided by the developer to an end-user of an application, while several of these other sliders and controls in the parameter display area 2310 are not made available to the end-user.

The mask intensity slider 2320 is a control that defines the intensity of a saturation mask (e.g., the saturation level calculated above using equation (2)). The mask intensity slider of some embodiments sets an amplification value for the saturation mask (e.g., the "Gain" parameter in equation (3), described above). In some embodiments, this mask intensity defines a saturation level that separates saturated colors from non-saturated colors. For instance, if the intensity of the mask is reduced then fewer pixels will be classified as saturated and the distinction between grayscale and color display adjustment may not be clear. Conversely, if the intensity of the mask is increased then more pixels will be classified as saturated and the distinction between color and grayscale display adjustment may become clearer.

The first set of sliders 2325 defines a first color correction function that is optimized for non-saturated pixels. Specifically, the first set of sliders defines constants that are associated with the gamma, lift, and gain parameters for the first color correction function (e.g., the color correction operation described above in reference to equation (4)). The second set of sliders 2330 defines a second color correction function for applying to saturated pixels (e.g., the color correction operation described above in reference to equations (5) and (6)). The second set of sliders includes similar parameters as the first set of controls. However, the second set of sliders 2330 also includes a slider that defines a constant for color saturation. These color correction functions are described above by reference to FIGS. 5-7.

The content mask check box 2335 allows the developer to easily customize the drawing APIs such that content elements of the UI are either masked or unmasked. In the example illustrated in FIG. 23, the parameter display area 2310 also includes several other controls for defining the drawing APIs (e.g., a pull-down menu for selecting a type of adjustment curve and several sliders for defining the selected curve).

The operations of the application development toolkit 2200 will now be described by reference to FIG. 23. As shown, a developer loads UI items (e.g., UI items 2205 and 2210) to generate drawing APIs. In this example, the UI items (e.g., UI screen capture images, buttons and other UI artwork, menu items, etc.) are displayed in the preview display area 2305. The user then selects an option to display the parameter display area 2310. Once the parameter display area is displayed, the developer adjusts various parameters to define the desired settings for the UI display adjustment by reviewing the effects on the UI item(s) in the preview display area 2305. After selecting the desired parameter values, the developer may store the resulting drawing APIs (e.g., color contrast APIs 2230 or 2245) as part of a framework (e.g., framework 2215 or 2220). In addition, the various application user interface items 2205 or 2210 may be stored as part of a framework (e.g., UI items 2235 or 2250). In some embodiments, the UI items 2235 or 2250 are not stored as part of a framework, but the storage 2205 or 2210 may be accessed by the framework 2215 or 2220 as needed.

Figure 24:
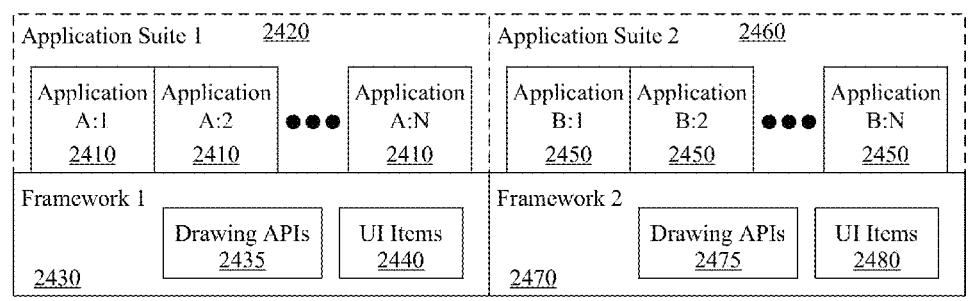
FIG. 24 illustrates an example of two such frameworks as used by various client applications at run-time.

FIG. 24 illustrates an example of two such frameworks as used by various client applications at run-time. Specifically, this figure shows various client applications 2410 from a first suite of applications 2420 using a first framework 2430 that includes a set of UI drawing APIs 2435 and a database of UI items 2440. In addition, this figure shows other client applications 2450 from a second suite of applications 2460 using a second framework 2470 that includes a set of UI drawing APIs 2475 and a database of UI items 2480.

The various client applications 2410 and 2450 each execute over a framework 2430 or 2470. When a user of a particular application 2410 or 2450 modifies a display setting of the UI generated by the application 2410 or 2450, the updated display setting is passed to a set of drawing APIs 2435 or 2475 which then renders the UI items for display or caching. In some cases, the framework retrieves data from the appropriate UI item database 2440 or 2480 in order to update the UI. In other cases, the set of drawing APIs 2435 or 2475 renders the UI items for display or caching without accessing the UI item database 2440 or 2480. In such cases, a client application may still use one or more APIs (e.g., color contrast API 2230 or 2245) to perform image processing operations on a UI item (e.g., the client application may draw a circle and request that the circle be drawn using a yellow theme color, where the yellow theme color has been color contrast adjusted).

In some embodiments, the adjustment to the display setting of a particular application triggers an adjustment to the other applications associated with the framework (i.e., the other applications in a particular suite of applications). In some such embodiments, the framework directs the UI items that are displayed in UIs generated by the other applications in the particular suite of applications to be redrawn.

VI. Process for Defining an Application

Figure 25:
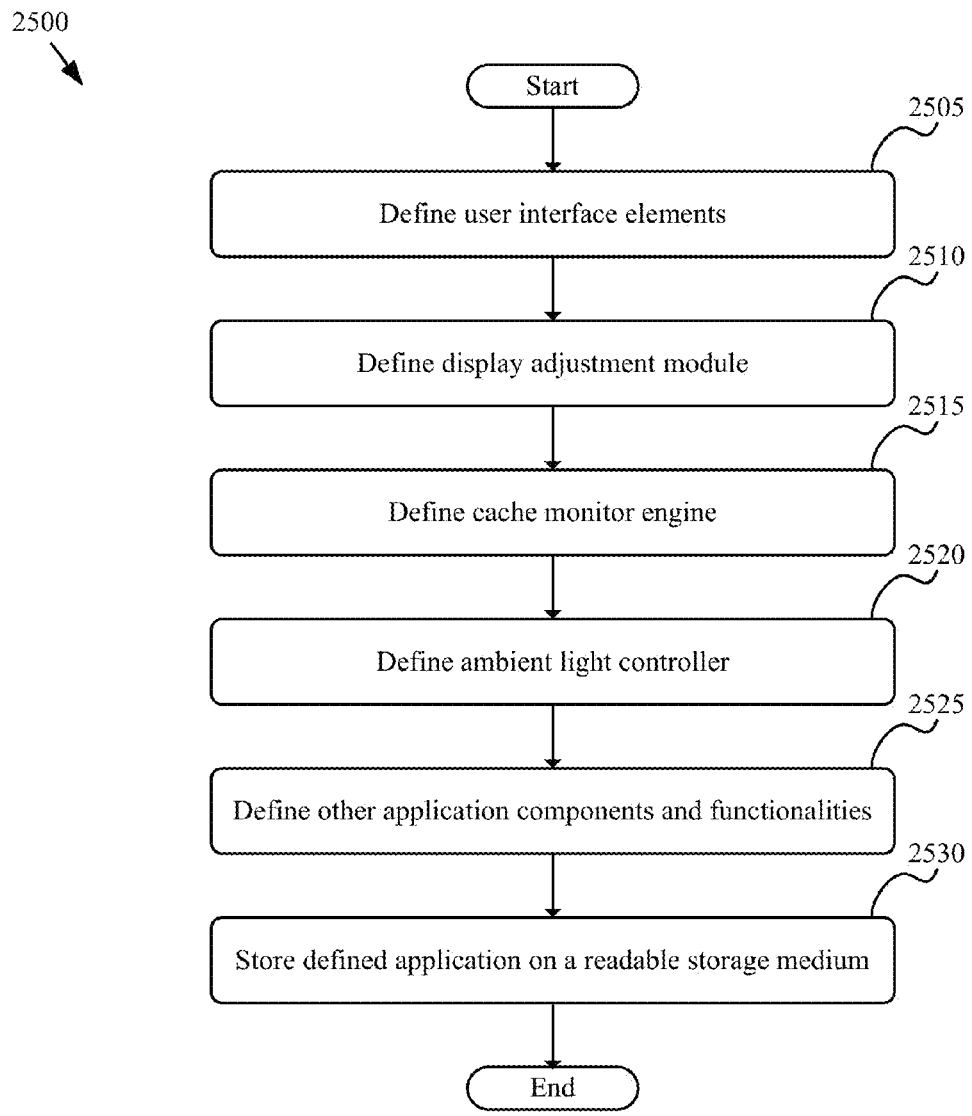
FIG. 25 conceptually illustrates a process used by some embodiments to define an application including UI display adjustment control.

Section IV, above, described and illustrated the software architecture of an application in accordance with some embodiments. FIG. 25 conceptually illustrates a process 2500 of some embodiments for defining an application, such as the application 1800. As shown, process 2500 begins by defining (at 2505) UI elements. In some embodiments, these UI elements are defined using UI items stored in storage.

Process 2500 then defines (at 2510) a display adjustment module. The display adjustment module 1830 shown in FIG. 18 is an example of such a module. Next, the process defines (at 2515) a cache monitor engine. As mentioned above, the cache monitor engine of some embodiments monitors stored UI items in one or more caches to improve overall performance when changing display settings of the UI.

The process 2500 next defines (at 2520) an ambient light controller. An example of such ambient light controller is described above by reference to FIGS. 18 and 20. The process then defines (at 2525) other application components and functionalities. After 2525, the components of the application are all defined. Accordingly, the process stores (at 2530) a representation of the application in a readable storage medium. The readable storage medium may be a disk (e.g., CD, DVD, hard disk, etc.) or a solid-state storage device (e.g., flash memory) in some embodiments. One of ordinary skill in the art will recognize that the various components (e.g., engine, module, UI elements) defined by process 2500 are not exhaustive of the modules and components that could be defined and stored on a readable storage medium for an application incorporating some embodiments of the invention.

VII. Computer System

Many of the above-described processes and modules are implemented as software processes that are specified as a set of instructions recorded on a computer readable storage medium (also referred to as "computer readable medium" or "machine readable medium"). When these instructions are executed by one or more computational element(s), such as processors or other computational elements like Application-Specific ICs ("ASIC") and Field Programmable Gate Arrays ("FPGA"), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and/or electronic signals passing wirelessly or over wired connection.

In this specification, the term "software" includes firmware residing in read-only memory or applications stored in magnetic storage which can be read into memory for processing by one or more processors. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computer systems define one or more specific machine implementations that execute and perform the operations of the software programs.

Figure 26:
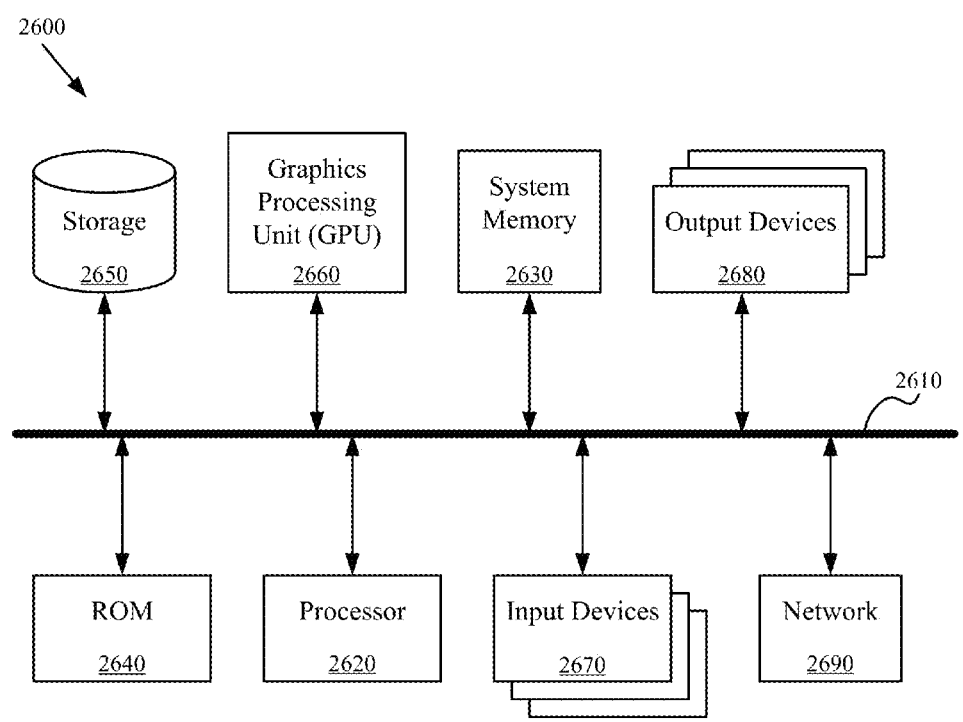
FIG. 26 illustrates a computer system with which some embodiments of the invention are implemented.

FIG. 26 conceptually illustrates a computer system 2600 with which some embodiments of the invention are implemented. For example, the system described above in reference to FIG. 18 may be at least partially implemented using sets of instructions that are run on the computer system 2600. As another example, the processes described in reference to FIGS. 2, 5, 16, and 19 may be at least partially implemented using sets of instructions that are run on the computer system 2600.

Such a computer system includes various types of computer readable mediums and interfaces for various other types of computer readable mediums. Computer system 2600 includes a bus 2610, a processor 2620, a system memory 2630, a read-only memory (ROM) 2640, a permanent storage device 2650, a graphics processing unit ("GPU") 2660, input devices 2670, output devices 2680, and a network connection 2690. The components of the computer system 2600 are electronic devices that automatically perform operations based on digital and/or analog input signals. The various examples of UI display adjustment algorithms and controls shown in FIGS. 10-15 may be at least partially implemented using sets of instructions that are run on the computer system 2600 and displayed using the output devices 2680.

One of ordinary skill in the art will recognize that the computer system 2600 may be embodied in other specific forms without deviating from the spirit of the invention. For instance, the computer system may be implemented using various specific devices either alone or in combination. For example, a local PC may include the input devices 2670 and output devices 2680, while a remote PC may include the other devices 2610-2660, with the local PC connected to the remote PC through a network that the local PC accesses through its network connection 2690 (where the remote PC is also connected to the network through a network connection).

The bus 2610 collectively represents all system, peripheral, and chipset buses that communicatively connect the numerous internal devices of the computer system 2600. In some cases, the bus 2610 may include wireless and/or optical communication pathways in addition to or in place of wired connections. For example, the input devices 2670 and/or output devices 2680 may be coupled to the system 2600 using a wireless local area network (W-LAN) connection, Bluetooth®, or some other wireless connection protocol or system.

The bus 2610 communicatively connects, for example, the processor 2620 with the system memory 2630, the ROM 2640, and the permanent storage device 2650. From these various memory units, the processor 2620 retrieves instructions to execute and data to process in order to execute the processes of some embodiments. In some embodiments the processor includes an FPGA, an ASIC, or various other electronic components for execution instructions.

The ROM 2640 stores static data and instructions that are needed by the processor 2620 and other modules of the computer system. The permanent storage device 2650, on the other hand, is a read-and-write memory device. This device is a non-volatile memory unit that stores instructions and data even when the computer system 2600 is off. Some embodiments of the invention use a mass-storage device (such as a magnetic or optical disk and its corresponding disk drive) as the permanent storage device 2650.

Other embodiments use a removable storage device (such as a floppy disk, flash drive, or CD-ROM) as the permanent storage device. Like the permanent storage device 2650, the system memory 2630 is a read-and-write memory device. However, unlike storage device 2650, the system memory 2630 is a volatile read-and-write memory, such as a random access memory (RAM). The system memory stores some of the instructions and data that the processor needs at runtime. In some embodiments, the sets of instructions and/or data used to implement the invention's processes are stored in the system memory 2630, the permanent storage device 2650, and/or the read-only memory 2640. For example, the various memory units include instructions for processing multimedia items in accordance with some embodiments.

In addition, the bus 2610 connects to the GPU 2660. The GPU of some embodiments performs various graphics processing functions. These functions may include display functions, rendering, compositing, and/or other functions related to the processing or display of graphical data.

The bus 2610 also connects to the input devices 2670 and output devices 2680. The input devices 2670 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 2680 include printers, electronic display devices that display still or moving images, and electronic audio devices that play audio generated by the computer system. For instance, these display devices may display a UI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 26, bus 2610 also couples computer 2600 to a network 2690 through a network adapter (not shown). In this manner, the computer can be a part of a network of computers (such as a local area network ("LAN"), a wide area network ("WAN"), an Intranet, or a network of networks, such as the Internet. For example, the computer 2600 may be coupled to a web server (e.g., network 2690) so that a web browser executing on the computer 2600 can interact with the web server as a user interacts with a UI that operates in the web browser.

As mentioned above, some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of this specification, the terms display or displaying mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and/or any other ephemeral signals.

It should be recognized by one of ordinary skill in the art that any or all of the components of computer system 2600 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. For example, several embodiments were described above by reference to particular applications (and their associated UIs) with particular features and components (e.g., with a particular content display area). However, one of ordinary skill will realize that other embodiments might be implemented with other types of applications (and/or other associated UIs) with other types of features and components (e.g., other types of content display areas).

Moreover, while the examples shown illustrate many individual modules as separate blocks (e.g., the display adjustment module 1830, the ambient light controller 1845, etc.), one of ordinary skill in the art would recognize that some embodiments may combine these modules into a single functional block or element. One of ordinary skill in the art would also recognize that some embodiments may divide a particular module into multiple modules.

One of ordinary skill in the art will realize that, while the invention has been described with reference to numerous specific details, the invention can be embodied in other specific forms without departing from the spirit of the invention. For instance, alternate embodiments may be implemented using different display controls, parameters, masking techniques, etc. One of ordinary skill in the art would understand that the invention is not to be limited by the foregoing illustrative details, but rather is to be defined by the appended claims.

We claim:

1. A method of dynamically adjusting an appearance of a user interface ("UI") displayed on a device, the method comprising:
   receiving a display adjustment parameter for optimizing the appearance;
   for a first set of saturated pixels having saturation values that satisfy a threshold saturation value, increasing the saturation values of the first set of pixels to a maximum saturation value;
   for a second set of non-saturated pixels having saturation values that do not satisfy the threshold saturation value, increasing the saturation values of the second set of pixels to saturation values within a range of saturation values that are less than the maximum saturation value; and
   based on the display adjustment parameter, adjusting the appearance of the UI by differentiating display adjustments to the first set of pixels from the display adjustments to the second set of pixels.

2. The method of claim 1, wherein the display adjustment adjustments are specified for different lighting conditions.

3. The method of claim 1, wherein adjusting the appearance of the UI comprises changing an appearance of the second set of pixels more than an appearance of the first set of pixels.

4. The method of claim 1 further comprising displaying a user-modifiable control that when adjusted specifies the display adjustment parameter, wherein receiving the display adjustment parameter comprises receiving a user's adjustment of the user-modifiable control.

5. The method of claim 1 further comprising computing the display adjustment parameter based on a measurement of ambient light, wherein said adjusting comprises automatically adjusting the appearance of the UI in accordance with the computed display adjustment parameter.

6. The method of claim 1, wherein the UI comprises a plurality of UI elements that are composited in order to render the UI for display.

7. The method of claim 6, wherein adjusting the appearance of the UI comprises:
   distinguishing the UI elements from any non-UI element; and
   adjusting the appearance of at least one of the UI elements while not adjusting the appearance of any non-UI element.

8. The method of claim 6, wherein adjusting the appearance of the UI comprises:
   identifying a first set of UI elements in the plurality of UI elements for pixel value adjustment; and
   adjusting pixel values of the first set of UI elements while not adjusting pixel values of a second set of UI elements.

9. The method of claim 6 further comprising:
   identifying any UI element that is stored in cache memory, wherein adjusting the appearance comprises retrieving any identified UI element from the cache memory and any other UI element from a disk to render the UI for display.

10. A non-transitory machine readable medium storing a program which when executed by at least one processing unit dynamically adjusts an appearance of a user interface ("UI") displayed on a device, the program comprising sets of instructions for:
    receiving a display adjustment parameter for optimizing the appearance;
    for a first set of saturated pixels having saturation values that satisfy a threshold saturation value, increasing the saturation values of the first set of pixels to a maximum saturation value;
    for a second set of non-saturated pixels having saturation values that do not satisfy the threshold saturation value, increasing the saturation values of the second set of pixels to saturation values within a range of saturation values that are less than the maximum saturation value; and
    based on the display adjustment parameter, adjusting the appearance of the UI by differentiating display adjustments to the first set of pixels from the display adjustments to the second set of pixels.

11. The non-transitory machine readable medium of claim 10, wherein the display adjustments are specified for different lighting conditions.

12. The non-transitory machine readable medium of claim 10, wherein the set of instructions for adjusting the appearance of the UI comprises a set of instructions for changing an appearance of the second set of pixels more than an appearance of the first set of pixels.

13. The non-transitory machine readable medium of claim 10, wherein the program further comprises a set of instructions for displaying a user-modifiable control that when adjusted specifies the display adjustment parameter, wherein the set of instructions for receiving the display adjustment parameter comprises a set of instructions for receiving a user's adjustment of the user-modifiable control.

14. The non-transitory machine readable medium of claim 10, wherein the program further comprises a set of instructions for computing the display adjustment parameter based on a measurement of ambient light, wherein the set of instructions for adjusting comprises a set of instructions for automatically adjusting the appearance of the UI in accordance with the computed display adjustment parameter.

15. The non-transitory machine readable medium of claim 10, wherein the UI comprises a plurality of UI elements that are composited in order to render the UI for display.

16. The non-transitory machine readable medium of claim 15, wherein the set of instructions for adjusting the appearance of the UI comprises sets of instructions for:
  distinguishing the UI elements from any non-UI element; and
  adjusting the appearance of at least one of the UI elements while not adjusting the appearance of any non-UI element.

17. The non-transitory machine readable medium of claim 15, wherein the set of instructions for adjusting the appearance of the UI comprises sets of instructions for:
  identifying a first set of UI elements in the plurality of UI elements for pixel value adjustment; and
  adjusting pixel values of the first set of UI elements while not adjusting pixel values of a second set of UI elements.

18. The non-transitory machine readable medium of claim 15, wherein the program further comprises sets of instructions for identifying any UI element that is stored in cache memory, wherein the set of instructions for adjusting the appearance comprises retrieving any identified UI element from the cache memory and any other UI element from a disk to render the UI for display.

19. A system comprising:
  a set of processing units for executing sets of instructions; and
  a memory for storing a program which when executed by at least one of the processing units dynamically adjusts an appearance of a user interface ("UI") for display, the program comprising sets of instructions for:
    receiving a display adjustment parameter for optimizing the appearance;
    for a first set of saturated pixels having saturation values that satisfy a threshold saturation value, increasing the saturation values of the first set of pixels to a maximum saturation value;
    for a second set of non-saturated pixels having saturation values that do not satisfy the threshold saturation value, increasing the saturation values of the second set of pixels to saturation values within a range of saturation values that are less than the maximum saturation value; and
    based on the display adjustment parameter, adjusting the appearance of the UI by differentiating display adjustments to the first set of pixels from the display adjustments to the second set of pixels.

20. The system of claim 19, wherein the display adjustments are specified for different lighting conditions.

21. The system of claim 19, wherein the set of instructions for adjusting the appearance of the UI comprises a set of instructions for changing an appearance of the second set of pixels more than an appearance of the first set of pixels.

22. The system of claim 19, wherein the program further comprises a set of instructions for displaying a user-modifiable control that when adjusted specifies the display adjustment parameter, wherein the set of instructions for receiving the display adjustment parameter comprises a set of instructions for receiving a user's adjustment of the user-modifiable control.

23. The system of claim 19, wherein the program further comprises a set of instructions for computing the display adjustment parameter based on a measurement of ambient light, wherein the set of instructions for adjusting comprises a set of instructions for automatically adjusting the appearance of the UI in accordance with the computed display adjustment parameter.

24. The system of claim 19, wherein the UI comprises a plurality of UI elements that are composited in order to render the UI for display.

25. The system of claim 24, wherein the set of instructions for adjusting the appearance of the UI comprises sets of instructions for:
  distinguishing the UI elements from any non-UI element; and
  adjusting the appearance of at least one of the UI elements while not adjusting the appearance of any non-UI element.

26. The system of claim 24, wherein the set of instructions for adjusting the appearance of the UI comprises sets of instructions for:
  identifying a first set of UI elements in the plurality of UI elements for pixel value adjustment; and
  adjusting pixel values of the first set of UI elements while not adjusting pixel values of a second set of UI elements.

27. The system of claim 24, wherein the program further comprises sets of instructions for identifying any UI element that is stored in cache memory, wherein the set of instructions for adjusting the appearance comprises retrieving any identified UI element from the cache memory and any other UI element from a disk to render the UI for display.

* * * * *